United States Patent [19]

Montgomery

[11] 4,408,323

[45] Oct. 4, 1983

[54] PROCESSOR FACILITIES FOR INTEGRATED PACKET AND VOICE SWITCHING

[75] Inventor: Warren A. Montgomery, De Kalb, Ill.

[73] Assignee: Bell Telephone Laboratories, Incorporated, Murray Hill, N.J.

[21] Appl. No.: 278,861

[22] Filed: Jun. 29, 1981

[51] Int. Cl.[3] ............................................. H04Q 11/04
[52] U.S. Cl. ........................................ 370/60; 370/58
[58] Field of Search ................... 370/60, 58, 94, 66

[56] References Cited

U.S. PATENT DOCUMENTS

| | | | |
|---|---|---|---|
| 3,627,951 | 12/1971 | Batin | 179/15 |
| 3,988,545 | 10/1976 | Kuemmerle et al. | 370/60 |
| 4,032,719 | 6/1977 | Blasbalg | 179/15 |
| 4,071,701 | 1/1978 | Leijonhufvud et al. | 179/15 |
| 4,112,258 | 9/1978 | Alles | 179/15 |
| 4,154,982 | 5/1979 | Charransol et al. | 179/15 |
| 4,207,435 | 6/1980 | Okada et al. | 370/68 |

FOREIGN PATENT DOCUMENTS

| | | |
|---|---|---|
| 1027265 | 2/1978 | Canada. |
| 2451837 | 5/1975 | Fed. Rep. of Germany. |
| 2122740 | 8/1972 | France. |
| 1441452 | 6/1976 | United Kingdom. |
| 1444804 | 8/1976 | United Kingdom. |
| 1521209 | 8/1978 | United Kingdom. |
| 1528240 | 10/1978 | United Kingdom. |

OTHER PUBLICATIONS

1980 International Conference on Communications, Seattle, Wa., 8-12 Jun., 1980, by Ross et al., "An Architecture For A Flexible Integrated Voice/Data Switch", pp. 21.6.1-21.6.5.

"Pacuit Switching Combines Two Techniques in One Network" by Sanders & de Smet, Computer Design, vol. 15, No. 6, p. 83-88, Jun. 1976.

"Integrated Service Communication System" by Ito et al., NTG-Fachber (Germany), vol. 73, 1980, pp. 177-181.

"Flexible Multiplexing Technique . . . " by Miyahara et al., Transactions of the IECE of Japan, vol. E64, No. 6, Jun. 1981, pp. 390-397.

1978 International Zurich Seminar on Digital Communications, Mar. 7-9, 1978, Zurich "A Flexible Experimental Digital Switching Office", pp. A4.1-A4.4.

1978 International Zurich Seminar on Digital Communications, Mar. 7-9, 1978, Zurich "An Intelligent Network Processor for a Digital Central Office", pp. A5.1-A5.6.

*Primary Examiner*—Douglas W. Olms
*Attorney, Agent, or Firm*—F. W. Padden

[57] ABSTRACT

A communication method and switching system in which voice and data signals are communicated through the system by a programmed controlled switching processor. The switching processor reads these signals from an input memory where they were transferred from telephone stations and data terminals by a scanner. The voice and data signals are transmitted to telephone stations and data terminals by the switching processor storing these signals in an output memory from which they are retransmitted by a distributor to the telephone stations and data terminals. The intelligent processor reads data signals from the input memory and assembles these signals into data packets which are temporarily stored in the data memory. Subsequently, the intelligent processor transmits these data packets by storing the data signals in the output memory. The intelligent processor is controlled by program instructions from its program memory and data stored in a data memory by a parameter processor which has associated program and data memories.

38 Claims, 19 Drawing Figures

MEMORY MAP
FOR
DATA MEMORY 119

MEMORY LIST
IN MEMORY 123

TERMINAL SERVICE
TIMING DIAGRAM

RECEIVE PROGRAM

TRANSMIT PROGRAM

MEMORY MAPS FOR MEMORIES 121 & 119

FIG. 13 DATA SECTION OF PARAMETER PROC 122

FIG. 15

MICROPROGRAM INSTRUCTIONS

| | MICRO CONTROL MEMORY ADDRESS | PP PROGRAM MEMORY | | | ALU | | | FLAG CONT | | ALU REG C17 | REGISTER CONTROL DATA OUT REG | | | | | C REG CONTENT — DATA C23, C24, C25, C26 | | POLLING LOGIC | | PP DATA CONTROL | | FLAG RESET | |
|---|---|---|---|---|---|---|---|---|---|---|---|---|---|---|---|---|---|---|---|---|---|---|
| | | LSB OF ADDRESS C1,C2 | DATA IN SOURCE C3,C4 | R/W CONTROL C5,C6 | ALU FUNCT C7-C10 | A SOURCE C11,C12 | B SOURCE C13 | A C14 | B C15 | | C C18 | A C19 | B C20 | ADD C21 | B C22 | C23 | C24 C25 C26 | A C27 | B C28 | RD C29 | WRT C30 | A C31 | B C32 |
| 1501 | 30 | | | | | | | | | | | | | | | | | | | | | | |
| 1502 | 31 | POINTER | | READ | | | | | | | | | | | | | | | | | − | | |
| 1503 | 32 | END | | READ | ADD | B | C | | | | | − | | | | | | | | | − | | |
| 1504 | 33 | | ALU | WRITE | ADD | B | C | | | | | | − | | | | | | | | − | | |
| 1505 | 34 | POINTER | | | ADD | B | C | | | − | | | | − | | | | | | | | | |
| 1506 | 35 | | CC | | COMPARE | ALU REG | A | − | | | | | | | − | | | | | | | | |
| 1507 | 36 | | BUFFER | WRITE | | | | | | | | | | | | | 0 | | | | | | |
| 1508 | 37 | OP | | | | | | | | | | | | | | | − | | | | | | |
| ... | | | | | | | | | | | | | | | | | | | | | | | |
| 1509 | 230 | | | | | | | | | | | | | | | | | | | | | | |
| 1510 | 231 | POINTER | | READ | | | | | | | | | | | | | | | | | − | | |
| 1511 | 232 | START | | READ | ADD | B | C | | | | | − | | | | | | | | | − | | |
| 1512 | 233 | | ALU | WRITE | ADD | A | C | | | | | | − | | | | | | | | − | | |
| 1513 | 234 | POINTER | | | ADD | A | C | | | | 1 | | | − | | | | | | | | | − |
| 1514 | 235 | | CC | | COMPARE | A | C | − | | | | | | | − | | | | | | | | |
| 1515 | 236 | | | | | | | | | | | | | | | | 0 | | | | | | |
| 1516 | 237 | OP | BUFFER | WRITE | | | | | | | | | | | | | − | | | | | | |

MEMORY MAPS FOR MEMORIES 121 & 123

MEMORY MAPS FOR MEMORIES 121 & 123

MEMORY MAPS FOR MEMORIES 121 & 123

MEMORY MAPS FOR MEMORIES 121 & 123

PROCESSOR FACILITIES FOR INTEGRATED PACKET AND VOICE SWITCHING

TECHNICAL FIELD

This invention relates to a method and switching processor facilities for controlling integrated voice and data switching through a communication system. The method and processor facilities directly switch encoded voice signals and assemble packets of data words from data terminals for subsequent transmission to destination data terminals.

BACKGROUND OF THE INVENTION

The different characteristics of voice and data information compound the problems of switching both types of information in the same switching system. There are two distinct characteristics of data communications which distinguish it from voice communication and which make the use of dedicated voice channels for data inefficient. In general, data is transmitted in short, high-rate bursts with long pauses in between bursts. The second characteristic is that, in many data applications, there is a very low average data rate compared to the data rate required for voice communication.

Known packet switching provides a solution to these problems by collecting a burst of data in one or more packets, each of which can be moved through the switching facilities at a rate convenient for the switching system. A packet consists of a predetermined number of data bytes, together with synchronization and other identifying data such as a header. The packet is a unit of data which can be moved, stored and otherwise manipulated through the system and has the desirable characteristic that it allows the system to transmit the packets at a data rate which is well suited for the efficiency of the system.

It is highly desirable for voice and data communication switching to be provided by one integral system so as to increase the flexibility and efficiency of the switching functions. Prior art systems customarily use two distinct subsystems in order to switch data packets and voice signals. In one such arrangement, the data and voice are separated at the input to the system and then the voice is switched by one switching subsystem while the packets are gathered and switched by another. In another prior art system, data is first converted from digital signals to modulated analog signals having frequencies similar to those of the human voice. The voice and modulated analog data signals are then switched through a voice network with the modulated analog data signals being connected to a separate packet switching subsystem.

Such prior art systems for switching packets and voice are deficient in that they require, in reality, two distinct systems. The use of two distinct systems have proven to result in higher cost and complexity to both communication companies and their customers.

In view of the foregoing, there exists a need for a communication system which has the capability of interconnecting both voice and data terminals through a single communication switching system with efficiency and without prolonged dedication of communication channels for the integrated data and voice communications.

SUMMARY OF THE INVENTION

The foregoing problems are solved and a technical advance is achieved in accordance with principles of this invention incorporated in an illustrative method and structured embodiment in which voice and data packet signals are communicated through a single digital communication switching system advantageously under control of a program controlled switching processor.

The novel switching processor is equipped with an intelligent processor and its stored program memory, a parameter processor and its associated stored program and data memories, and a data memory cooperatively controlled by the intelligent processor and the parameter processor for dynamically assembling in real-time packets of data from a plurality of data terminals and thereafter transmitting the assembled data packets to appropriate destination data terminals.

The illustrative communication system comprises a plurality of modules for terminating a plurality of telephone stations and data terminals, and input and output memories for storing the voice and data packet signals. Each module is equipped with analog and data interface units which interconnect the telephone stations and data terminals to a scanner and a distributor in the same module. The scanners and distributors are operative under control of a clock for transmitting and receiving voice and data signals, respectively, to the input and output memories under control of the stored program switching processor of the present invention.

A departure in the art provided by this invention is that the switching processor is responsive to program instructions to switch via the input and output memories and the module circuitry, encoded voice signals between the telephone stations, to assemble data words received from data terminals into packets which are then stored in the data memory of the switching processor, and to transmit assembled stored packets from that memory to destination data terminals.

The switching processor reads encoded voice signals and data words from the input memory which has received them from telephones and data terminals and writes the encoded voice signals and data words from assembled packets into the output memory from which these signals and words are transmitted to telephones and data terminals. The program instructions are divided into three routines. One routine controls the switching processor to perform the switching of telephone conversations, a second routine referred to as the receive routine controls the switching processor in the assembly of packets, and a third routine referred to as the transmit routine controls the switching processor in the transmission of assembled packets to destination terminals.

The intelligent processor program memory stores the first, second, and third routines which are used to control the intelligent processor. In response to the second routine, the intelligent processor reads a data word from the input memory and stores that word in an area of the data memory called a buffer. A first address word stored in the data memory is used by the intelligent processor to identify the address of the data word in the input memory. In addition, a second address word stored in the data memory is used by the intelligent processor to identify the buffer word in which the data word from the input memory is to be stored.

The intelligent processor is responsive to the third routine stored in its program memory to read a data word from a buffer containing a complete packet stored in the data memory and to write that data word into a word in the output memory. The intelligent processor identifies the data word in the buffer by using a third address word stored in the data memory and identifies the output memory word by a fourth address word stored in the data memory.

During assembly of packets, the parameter processor is responsive to instruction words stored in its program memory to control the intelligent processor with respect to the rate and location of the word read from the input memory and the location in the data memory where that word should be stored. Also, during transmission of assembled packets, the parameter processor controls the intelligent processor with respect to the rate and location of the word read from the data memory and where in the output memory that word is stored. Under control of the instruction words stored in the parameter processor program memory, the parameter processor performs its control functions by writing addresses read from the parameter processor data memory into the first, second, third and fourth address words in the data memory within a fixed repetitive time period. The parameter processor data memory stores these addresses in segments of memory with each type of address being stored in a particular segment. During each time period, the parameter processor reads one address from each segment in the parameter processor data memory and writes these addresses into the associated address words in the data memory.

The method departure in the art processes encoded voice signals from telephone stations via the input memory to telephone stations via the output memory and data signals from data terminals via the input memory into packets of data signals which are stored in a first data memory and the subsequent retransmission of these packets to destination data terminals via the output memory.

The novel method is provided for communicating voice signals between telephone stations and for assembling data signals from data terminals into data packets and for subsequent transmission of the assembled data packets to destination data terminals. The steps involve communicating the voice and data signals from the stations and data terminals to an input memory for storage. The stored voice signals are next sent from the input memory to an output memory for temporary storage and subsequent communication to a destination telephone station. The stored data signals are transferred from the input memory to a buffer in a data memory associated with a destination data terminal until the buffer contains a complete packet. Upon completion of a data packet, the buffer contents are transferred to the output memory for a subsequent transmission to the destination data terminal.

The packets of data signals are stored as data words in buffers in the first data memory. When a data terminal starts to transmit a new packet, a buffer is assigned to the packet from a group of unassigned buffers and a first address word in the first data memory identifies the first buffer of this group. A word in the first buffer identifies the second buffer which has a word identifying the third buffer, etc. The assignment of the unused buffer is accomplished by storing the contents of the first address word in a second address word which is associated with the transmitting data terminal. The words in the first data memory and the input memory which are used in the assembling of a packet from a transmitting data terminal are identified by addresses which are transferred from a second data memory and stored in the first data memory. The word to be accessed in the input memory and the second address word are identified by addresses which are transferred from the second data memory to the first data memory. The location where a given word of the packet is to be stored in the buffer is determined by adding a counter word to the second address word and incrementing the counter word in preparation for the storage of the next word. The number of words in the packet is designated by the first word of the packet which is stored in the length data word in the first data memory as well as in the buffer. A completely assembled packet is determined when the counter word equals the length data word. The counter word and the length data word associated with the transmitting terminal are determined by addresses which are transferred from the second data memory to the first data memory.

The word to be accessed in the output memory, the third address word, and the fourth address word are identified by addresses which are transferred from the second data memory to the first data memory. After the packet has been assembled in the buffer, this just completed buffer is assigned to a group of buffers awaiting transmission to the destination terminal. This group of buffers is connected together as were the buffers in the group of unassigned buffers; but a third address word in the first data memory identifies the first buffer, and a fourth address word identifies the last buffer. The just completed buffer is assigned to this group of buffers awaiting transmission by having a word in the last buffer identify the just completed buffer and by storing the address of the just completed buffer in the fourth address word. When a packet has been transmitted, the buffer which stored that packet is returned to the group of unassigned buffers by storing the contents of the first address word in a word of the just freed buffer and by storing the address of the just freed buffer in the first address word. These words in the first data memory and the output memory which are used with the transmission of a completed packet to a destination data terminal are also identified by addresses which are transferred from the second data memory and stored in the first data memory.

DRAWING DESCRIPTION

Figure 12:
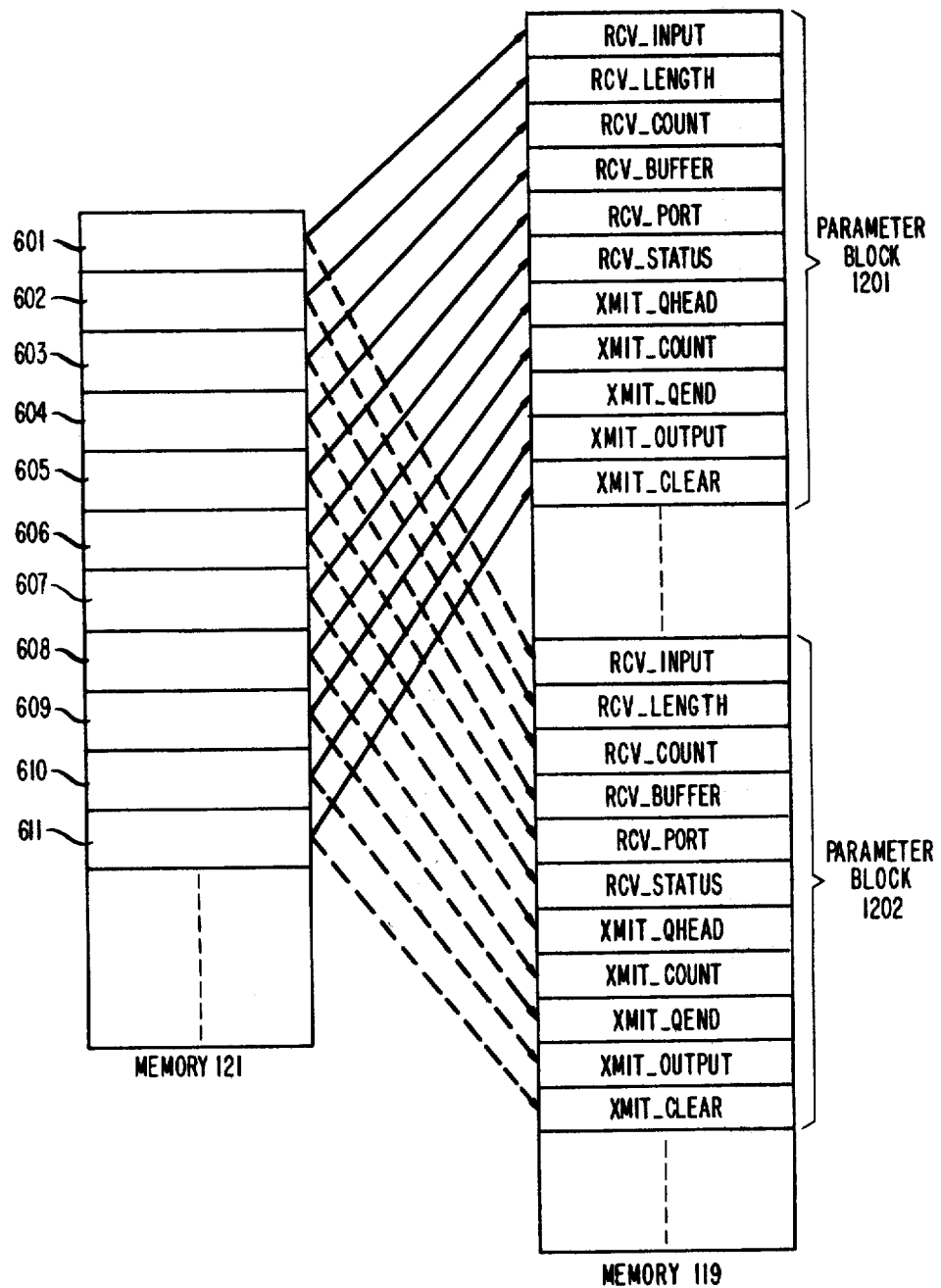
Figure 13:
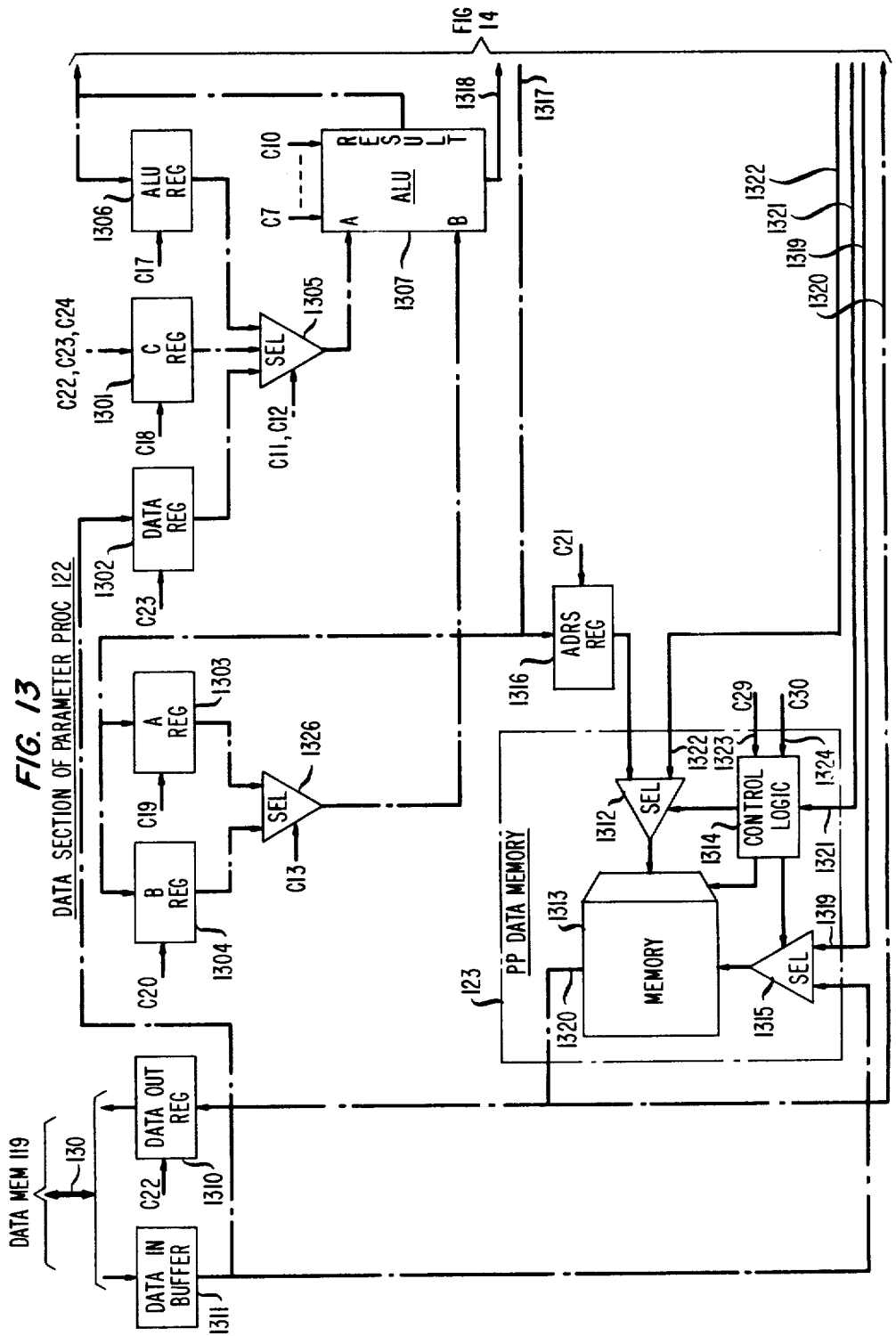
Figure 14:
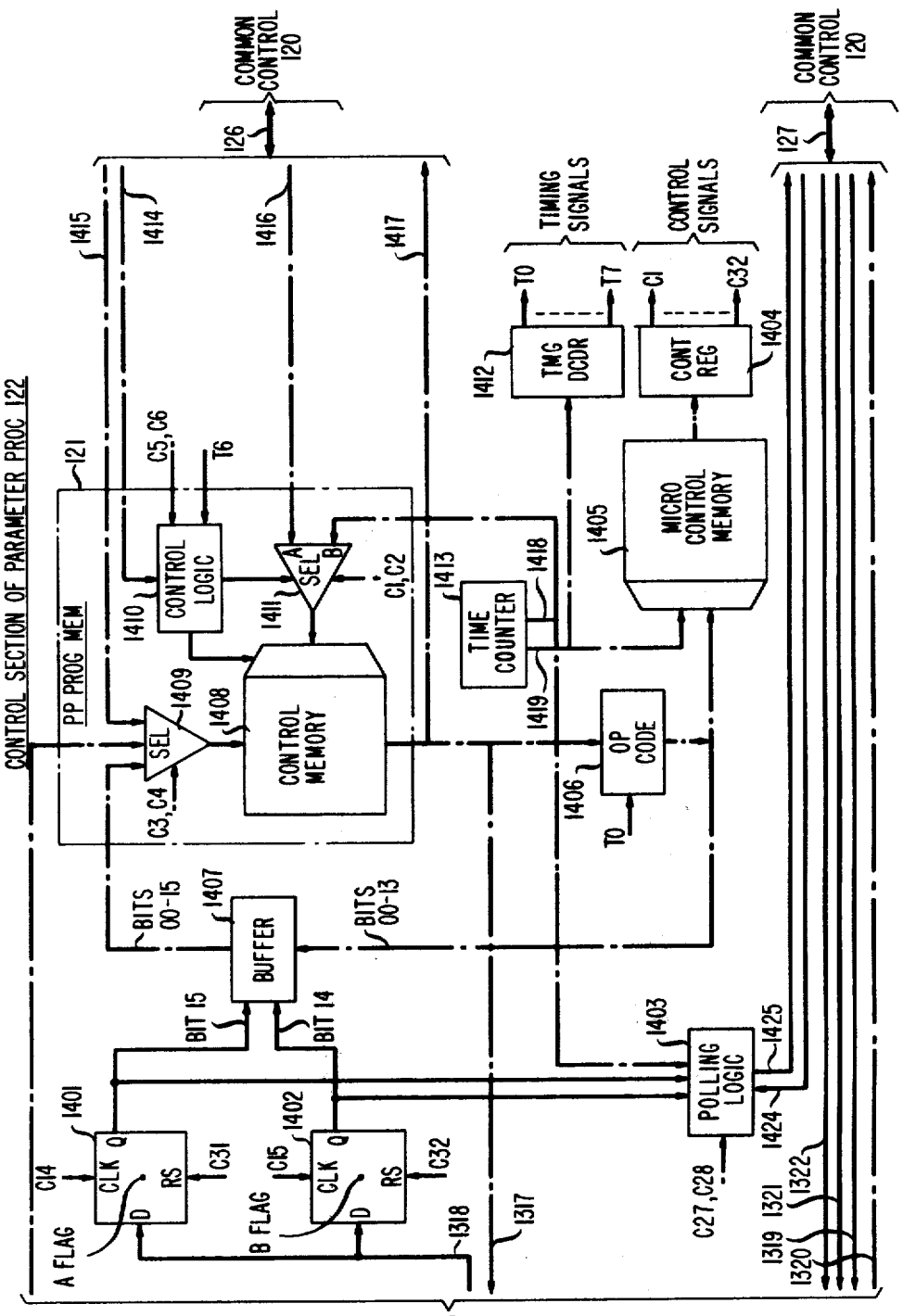
Figure 16:
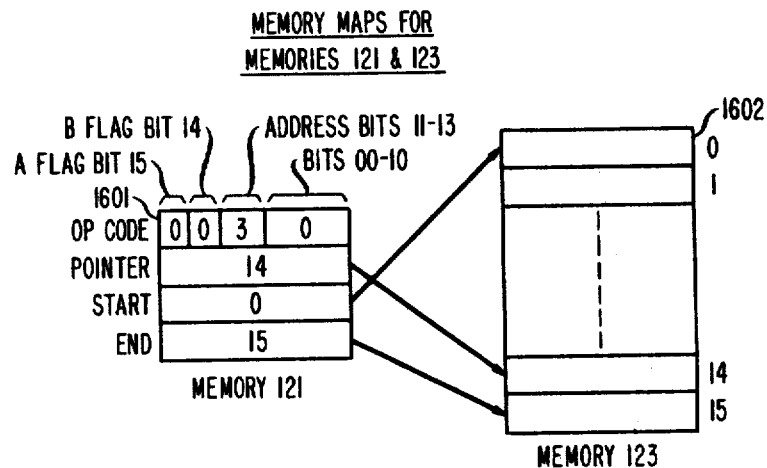
Figure 17:
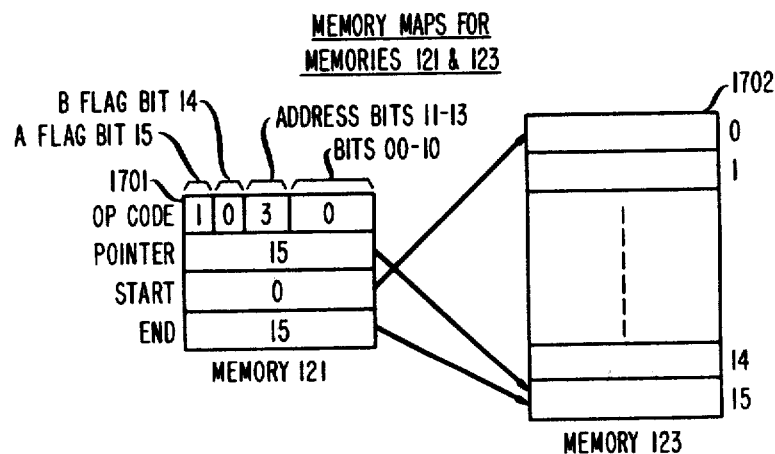
Figure 18:
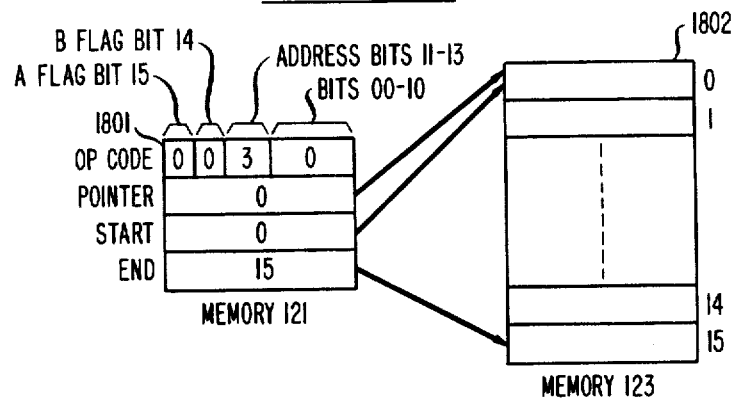
Figure 19:
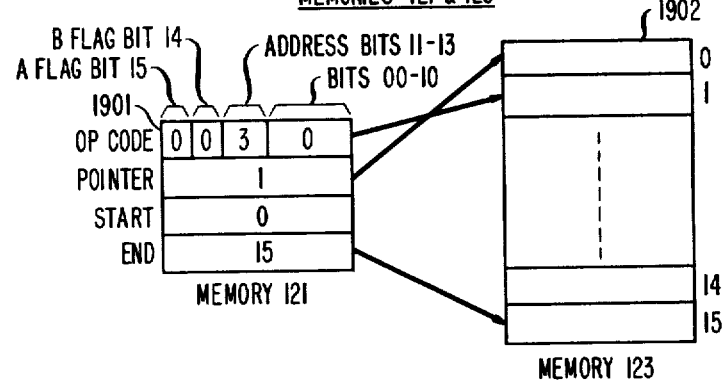

FIG. 12 shows a memory map for memories 119 and 121 and, in particular, the relationship between the execution of instructions stored in memory 121 by parameter processor 122 to store words in memory 119;

FIGS. 13 and 14 comprise a more detailed block diagram of parameter processor 122;

FIG. 15 is a table detailing microprogram instructions for parameter processor 122 which are stored in PP program memory 121; and FIGS. 16 through 19 show the memory maps for memories 121 and 123 as an illustrative example of passing parameters from memory 123 to memory 119 by the parameter processor 122 responding to instructions stored in memory 121.

GENERAL DESCRIPTION

Figure 1:
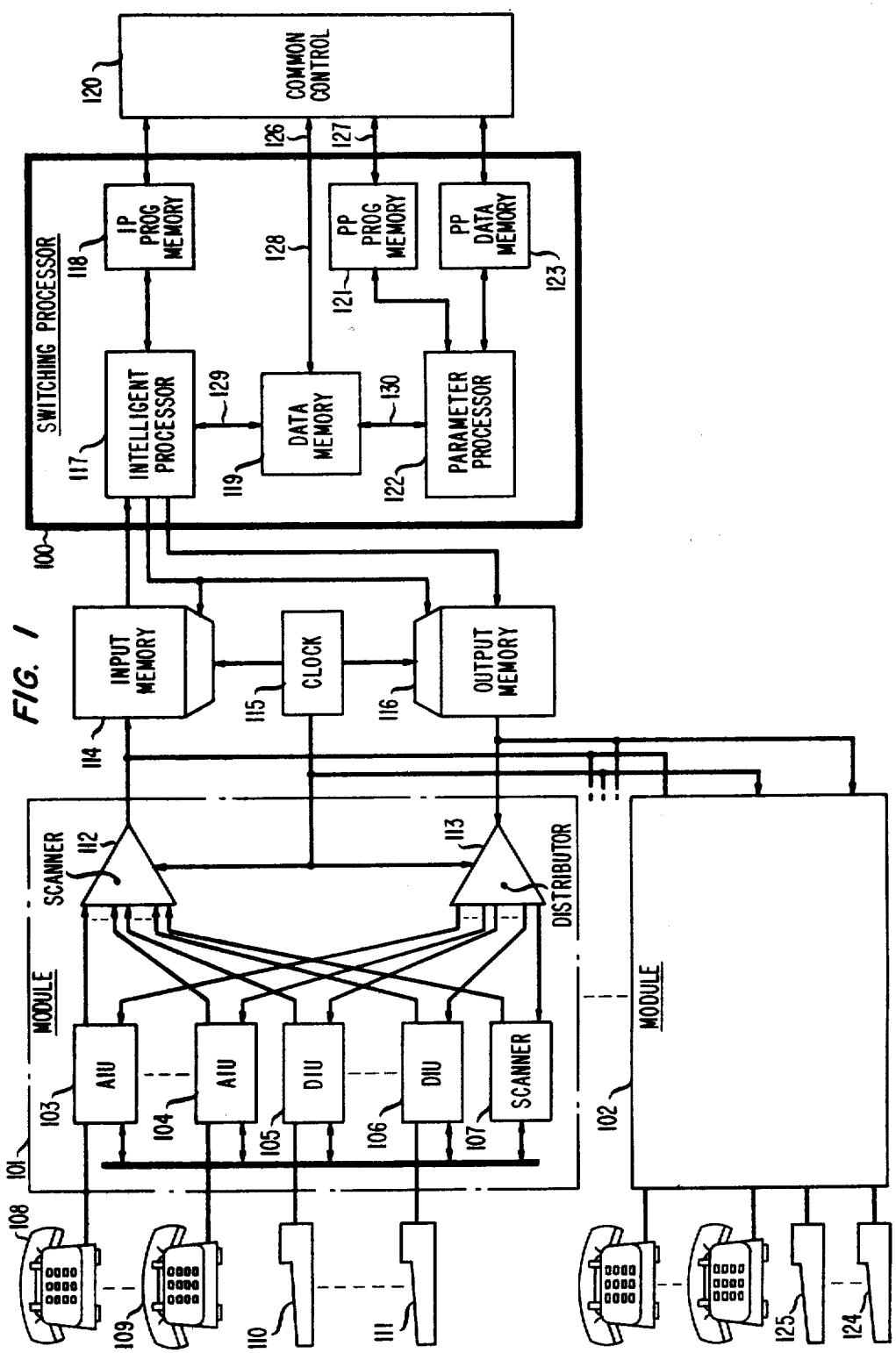
FIG. 1 shows, in block diagram form, a communication switching system utilizing a switching processor in accordance with the present invention.

FIG. 1 shows an illustrative stored program controlled voice and data communication switching system having a plurality of data terminals 110, 111, 124, and 125, and telephones 108 and 109 terminated on modules 101 and 102. The system operates on the basis of a repetitive time frame. Clock 115 generates timing signals for the operation of the circuitry in modules 101 and 102 in the repetitive time frames, each of which is illustratively 125 microseconds in duration. During each such frame, modules 101 and 102 transfer the information associated with telephones 108 and 109 and terminals 110, 111, 124, and 125 to the input memory 114. The switching of telephone conversations using an intelligent processor 117, and input and output memories 114, 116, and modules 101, 102 as shown in FIG. 1, is described in U.S. Pat. No. 4,112,258 of H. G. Alles, and now reissue application Ser. No. 234,016 which was filed Feb. 12, 1981. That patent describes the processing and switching of conventional telephone calls as well as three-way conference calls. Information associated with each such telephone call is transferred from input memory 114 to output memory 116 by a stored program intelligent processor 117. Advantageously, the same processor 117 assembles and transmits packets of information by the processes of extracting information for terminals 110, 111, 124, 125 from the storage of memory 114 and transferring it to data memory 119 and thereafter transferring that information to output memory 116 during a subsequent time frame after a complete packet has been assembled.

Voice information from a telephone is first converted from analog to digital by an analog interface unit (AIU), and information received from output memory 116 is converted from digital to analog by an AIU before transmission to the telephone. For example, AIU 103 performs this conversion function for telephone 108. Information transmitted to or from a data terminal is processed by a digital interface unit (DIU). Each module illustratively terminates a maximum of 128 telephones or data terminals connected to it. Each telephone or terminal has one uniquely associated word in input memory 114 and one uniquely associated word in output memory 116 which are used to transfer information to or from the associated AIU or DIU.

Clock 115 provides timing such that during each time frame an input and an output word is read and written for each telephone or data terminal from memory 114 and to memory 116. In response to timing signals from clock 115, each scanner in modules 101 and 102 reads a word from each associated AIU and DIU and writes these words into memory 114, and each distributor reads words from memory 116 and writes one word into each associated AIU or DIU.

Switching processor 100 of FIG. 1 is a data processing facility which implements the various voice and data switching functions of the switching system illustrated in FIG. 1. This facility is functionally divided into six elements comprising an intelligent processor 117, an IP (Intelligent Processor) program memory 118, a data memory 119, a parameter processor 122, a PP (Parameter Processor) program memory 121, and a PP (Parameter Processor) data memory 123. The IP program memory 118 is a temporary or erasable memory facility which employs apparatus for storing a plurality of instructions such as different sets of routines to control the intelligent processor 117 for the processing of voice and data information from the memory 114 to either memory 116 for voice information or to memory 119 for data information, in order to assemble complete packets of data information. Illustratively, one set of routines controls the operation of processor 117 in switching voice calls from a telephone station such as station 108, to read the digitally encoded voice signals stored in memory 114 and to affect the storage of these signals in memory 116 for transmission of these signals through modules 101 and 102 to a destination telephone, such as station 109. A second set of routines, referred to as a receive program, controls processor 117 for reading digital data signals stored in memory 114 and for affecting the storage of these data signals from memory 114 into memory 119 in order to assemble a complete data packet for subsequent transmission to a destination data terminal. The third set of routines, referred to as the transmit routine, drives processor 117 for transferring assembled data packets from memory 119 to memory 116 and for the transmission of the data packets therefrom through modules 101 and 102 to a destination terminal.

The data memory 119 is a temporary or erasable facility which utilizes a plurality of buffers in which intelligent processor 117 stores data words read from input memory 114 during receive program controlled operations. The buffers in memory 119 function on a linked list arrangement with lists of buffers being associated with transmitting or receiving data terminals or a pool of free buffers. In addition, memory 119 comprises sets of memory locations with each set of memory locations associated with either a receiving or transmitting data terminal's list of buffers; and the words stored in these sets of memory locations control logic operations of processor 117 during operations of the transmit and receive routines with respect to the assembly and extraction of packets of data from memory 119.

The words which are stored in the sets of memory locations are commonly called parameters and are supplied from the parameter processor 122 over bus 130. The types of words used to control the receiving of data from memory 114 for entry into a memory 119 buffer include a data word which defines the identification of the DIU from which data is originating and the address of a word in memory 114 which is transferring data from a particular terminal and addresses of words in memory 119 which define the expected length of a packet being assembled, the number of words of the packet which have been received, the buffer being used to assemble a packet, and the previous state of the terminal being serviced. The types of words used to control the transmission of assembled data packets include addresses of words in memory 119 which define the buffers which contain packets awaiting transmission and the number of words transmitted from an assembled packet and addresses which define where the data word from an assembled packet is to be written in memory 116 and an address of a word which is to be set to zero in memory 116.

PP data memory 123 stores each type of word supplied by parameter processor 122 to processor 117 in sections of memory referred to as lists. PP program memory 121 is a temporary erasable memory facility which employs apparatus for storing a plurality of instructions. Each of these instructions being uniquely associated with a particular list in memory 123. Processor 122 executes all of the instructions stored in memory 121 during each time frame, and each instruction causes processor 122 to transfer one parameter from the associated list in memory 123 to memory 119. At the end of each time frame, processor 122 has under control of the instructions in memory 121 transferred one parameter of each type used by the receive and transmit routines to control the logic operations which are performed by processor 117 in the assembling of data packets and the extracting of data packets.

Specifically, processor 117 reads digital data words from memory 114 associated with the transmitting terminal, such as terminal 110, until a packet is assembled for that terminal, and then transmits words from the assembled packet to a word in memory 116 associated with the receiving terminal, such as terminal 124. At the maximum data transmission rate, the assembly and transmission of packets is done at the rate of one digital data word per time frame. For slow data transfer rates, processor 117 does not handle a digital data word per terminal in each time frame; but rather it handles words associated with a particular terminal at a rate which is compatible with the terminal transmission rate.

In any given time frame, processor 117 is directed to the appropriate words in memories 114, 116 and 119 by parameters which are advantageously transmitted by the processor 122 to processor 117 via memory 119 and buses 130 and 129. In each frame, processor 122 transmits a set of parameters which are used by processor 117 during the next succeeding frame. These parameters determine not only which terminals will be serviced during a particular time frame, but the rate at which those terminals will be serviced. Processor 122 determines the rate by transmitting parameters which direct processor 117 to service the terminals at time periods matching the data transfer rate of the terminals. Programs or data for controlling the operations of the stored program controlled processors 117 and 122 are stored in an IP program memory 118, BP program memory 121, and BP data memory 123.

Common control 120 of FIG. 1 controls the switching system by writing programs into the memories 118, 121, and 123.

A terminal can only be transmitting one packet at a time; however, there may be a number of packets stored in data memory 119 which are waiting transmission to a destination data terminal. The packets are stored in buffers A-H (FIG. 2) of the data memory 119 while awaiting transmission. When a terminal starts to transmit a packet, a buffer is assigned to that terminal to store that packet. After it has been transmitted to the destination terminal, the previously assigned buffer is released as a free buffer. For example, when terminal 110 starts to transmit a packet to terminal 111, terminal 110 first transmits the header words followed by data words. The first word of the header defines the packet's length, and the second word defines the destination of the packet which is terminal 111 in this example. When processor 117 reads the first word of the header from input memory 114, it assigns a buffer in memory 119 to the new packet and then stores the packet's length in the second word of the assigned buffer.

The parameters passed by processor 122 to memory 119 determine in what time frames processor 117 reads data words from memory 114 associated with the packet which is being assembled. The words from memory 114 are then stored within the assigned buffer of memory 119. After the packet has been totally received and stored, the buffer will be assigned to a queue of other buffers containing packets which are awaiting transmission to terminal 111.

Processor 117 transmits from the queue of buffers awaiting transmission to terminal 111 on first-in, first-out basis. After all the words from a buffer have been transmitted, the buffer is placed in an idle queue; and processor 117 starts to transmit words from the next queued buffer to terminal 111.

DETAILED DESCRIPTION

The following describes in greater detail the manner in which processor 117, in response to instructions stored in memory 118, assembles packets of data words in memory 119 and subsequently affects the transfer of these data words to data terminals under control of parameters stored in memory 119 by processor 122. Processor 122 is operating in response to instructions stored in memory 121. In addition, greater detail is given with respect to processor 122 and memories 119, 121, and 123.

Figure 2:
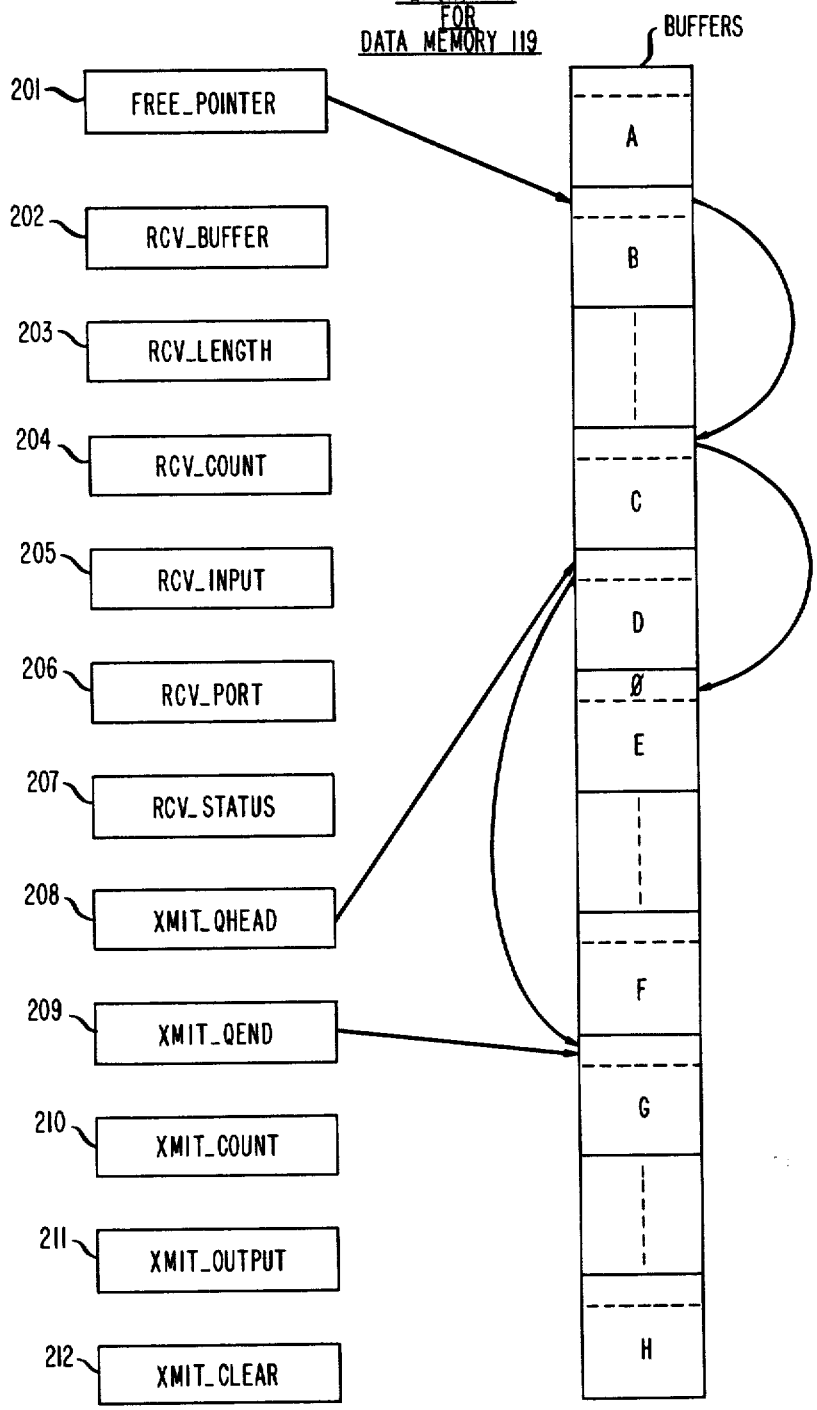
FIGS. 2 through 5 illustrate a memory map for data memory 119 and, in particular, illustrate the changes in the relationships between different sections of this memory map as packets are assembled and subsequently transmitted.

In order to further describe the assembly of packets and subsequent transmission of these packets, the example for the transmission of a packet from terminal 110 to terminal 111 of the previous section is now expanded to further explain the use of buffers within data memory 119. FIGS. 2 through 5 illustrate the words in memory 119 used to process packets and indicate the contents of these words at different steps in the operation. These words are broken up into a group of buffers A through H, with each buffer containing a plurality of words, a group of words 202 to 207 associated with a transmitting terminal, a group of words 208 to 212 associated with a receiving terminal, and a pointer word 201 associated with a group of concurrently unused buffers. Buffers can be assigned to either a transmitting or receiving terminal. Unassigned buffers are part of a group (free list) of unused buffers. Buffers are assigned to a particular list by linking them into the list. A list is designated by a pointer word in data memory 119 containing the address of the first word of the first buffer in the list. The first word of each buffer defines the next buffer to which the buffer is linked in a linked list. For example, as shown in FIG. 2, the first buffer of the free list is buffer B and is pointed to by FREE POINTER 201. The first word of buffer B points to the next buffer in the list which is buffer C, as shown in FIG. 2. The first word of buffer C points to the next buffer in the free list which is buffer E. Since buffer E is the last buffer in the free list, the first word of buffer E contains a zero which, by convention, indicates that buffer E is the last buffer. This method of linking buffers in a list is known. Associated with each terminal which is transmitting information, are six words, as shown in FIG. 2;

RCV BUFFER 202, RCV LENGTH 203, RCV COUNT 204, RCV INPUT 205, RCV STATUS 207, and RCV PORT 206. RCV BUFFER 202 contains the address of the first word of the buffer holding the packet which is being received from a terminal. RCV COUNT 204 is a word which defines the number of words of the packet which have been received, and RCV LENGTH 203 is a word which defines the maximum number of words in the packet. RCV INPUT 205 defines the address of a word in memory 114 which contains data from the transmitting terminal. RCV PORT 206 is a word which defines which terminal is transmitting the packet, and RCV STATUS 207 is a word which is used to determine whether a terminal has transmitted a new data word since last being serviced.

Each terminal which is receiving a packet has five words associated with it, and, as shown in FIG. 2, for this example, words 208 through 212 are the associated words. The XMIT QHEAD 208 is a word which contains the address of the first buffer awaiting transmission, and XMIT QEND 209 is a word which contains the address of the last buffer awaiting transmission. XMIT 210 COUNT is a word which defines the number of words of the packet addressed by XMIT QHEAD 208 which have already been transmitted to the receiving terminal. XMIT OUTPUT 211 is a word which contains the address of the word in output memory 116 of FIG. 1 which is associated with the receiving terminal. XMIT CLEAR is a word which defines a word to be set to "0" in memory 116.

Figure 3:
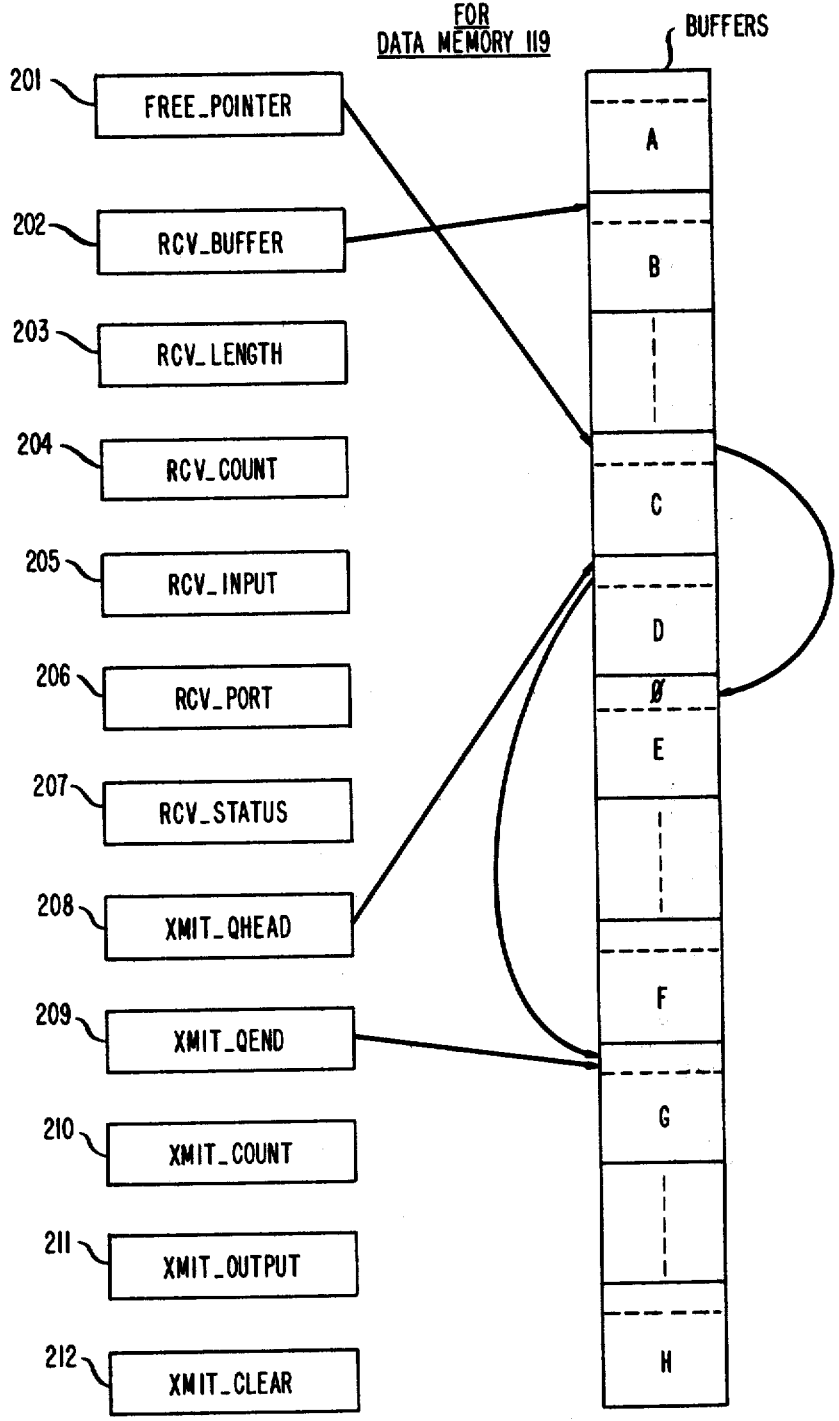

FIG. 2 illustrates the state of these different memory words in data memory 119 prior to the reception of the first word of the packet from data terminal 110 of FIG. 1 which is to be transmitted to data terminal 111. Upon receipt of the first word of the packet from terminal 110, processor 117 of FIG. 1, under stored program control and using well-known techniques, removes buffer B from the list of free buffers and writes the address of buffer B into RCV BUFFER 202. FREE POINTER 201 is updated by processor 117 to contain the address of the first word of buffer C. The state of the memory words after these operations have been performed is shown in FIG. 3.

Figure 4:
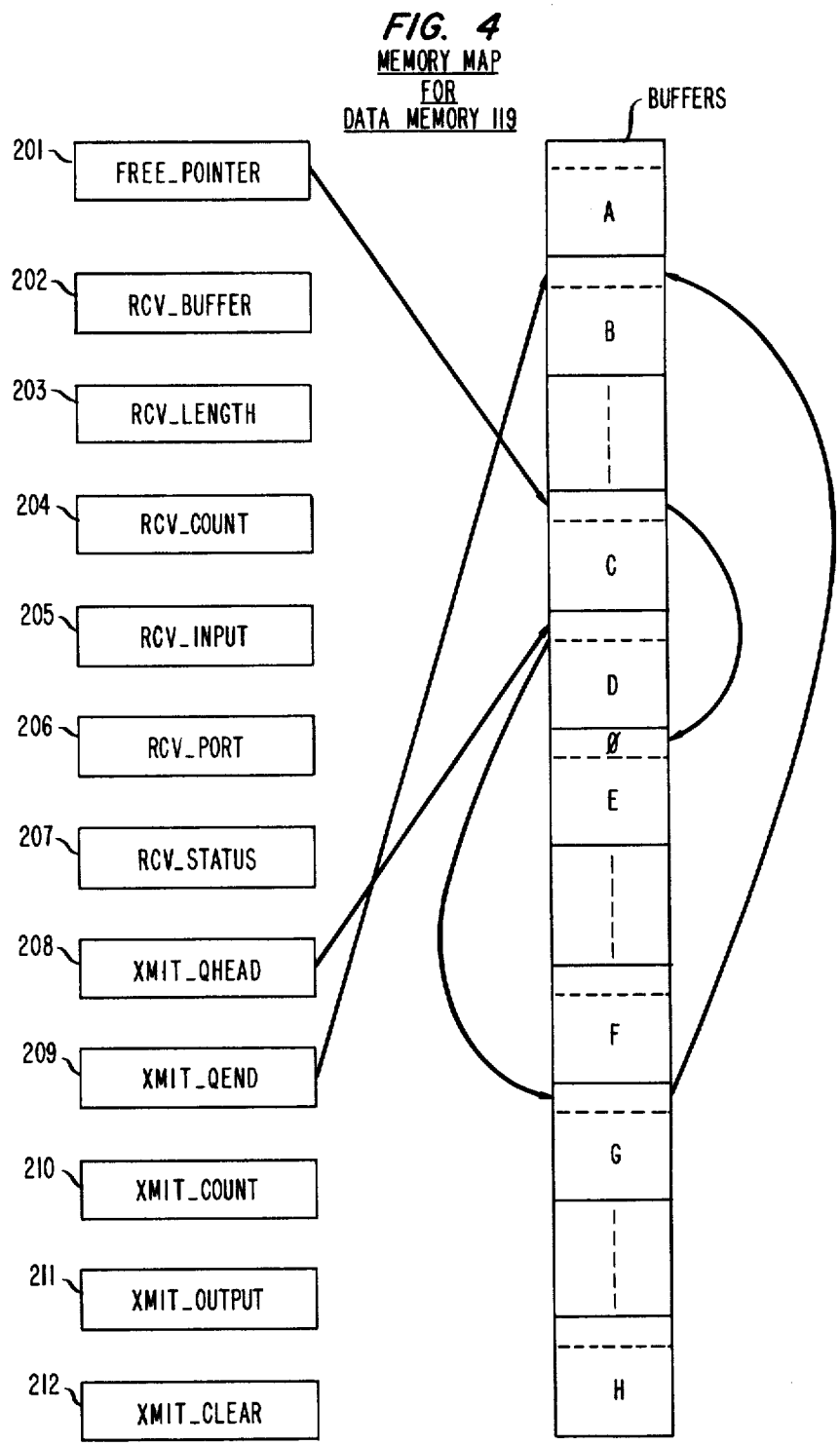

Processor 117, under stored program control, gathers the data words for the packet from input memory 114 and stores them in buffer B until RCV COUNT equals RCV LENGTH. When the entire packet has been received and stored in buffer B, using well-known techniques, processor 117, under stored program control, adds buffer B to the end of the list of buffers awaiting transmission to data terminal 111 for its subsequent transmission to data terminal 111. The state of the buffers after buffer B has been added to the transmission list is illustrated in FIG. 4. The first word of buffer G now points to buffer B and XMIT QEND 209 now points to buffer B, since buffer B is the last buffer which is awaiting transmission to data terminal 110. Terminal 110 is not transmitting a new packet and the foregoing operations are completed; then processor 117 sets RCV BUFFER 202 to zero. The significance of RCV BUFFER 202 containing a zero is explained in a later section which discusses the details of the receive program.

Figure 5:
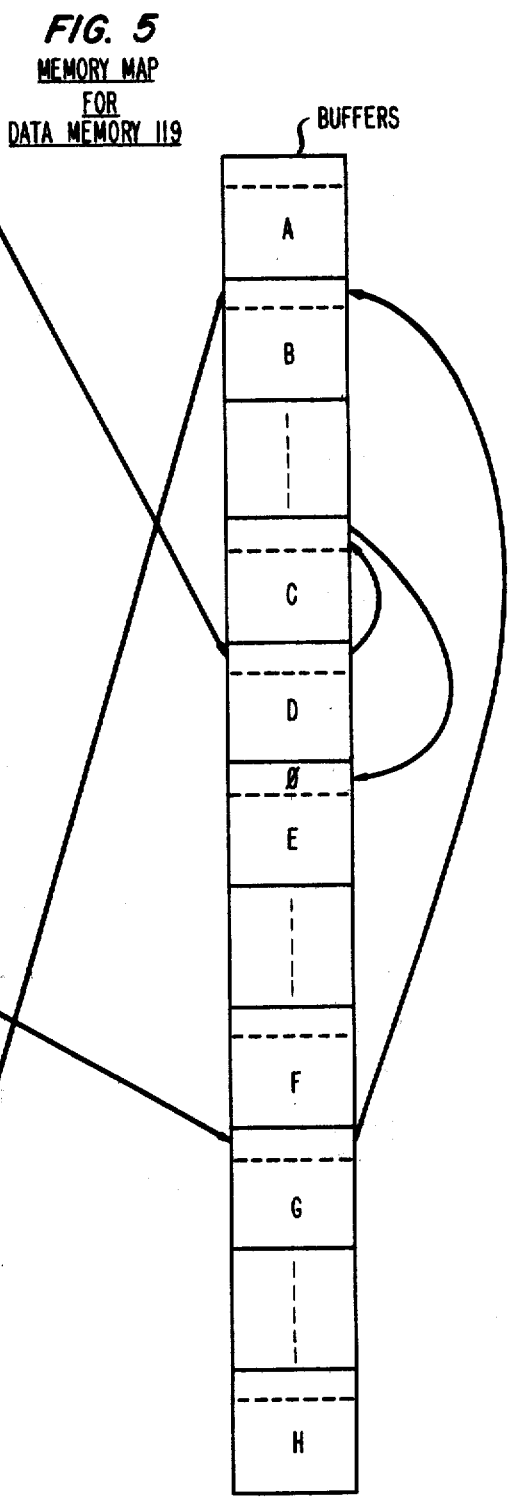

During the reception of the packet from terminal 110, processor 117 transmits data words from buffer D as illustrated by FIG. 2 by using words 208 through 212, but at a slower transmission rate than terminal 110's transmission rate. This transmission takes place by processor 117, under program control, reading the word designated by the result of adding XMIT COUNT 210 and XMIT-HEAD 208 together and storing the word in a memory location in output memory 116 of FIG. 1 designated by the contents of XMIT OUTPUT 211 of FIG. 2. After the packet contained in buffer D has been transmitted, buffer D is returned to the free list under control of processor 117, and XMIT QHEAD 208 is updated by processor 117 to point at buffer G. The new state of the memory words in memory 119 is illustrated in FIG. 5. The contents of FREE POINTER 201 has been modified to contain the address of the first word of buffer D, and the first word of buffer D has been modified to contain the address of the first word of buffer C. Note, that the buffers are returned to the head of the free list of buffers.

Figure 9:
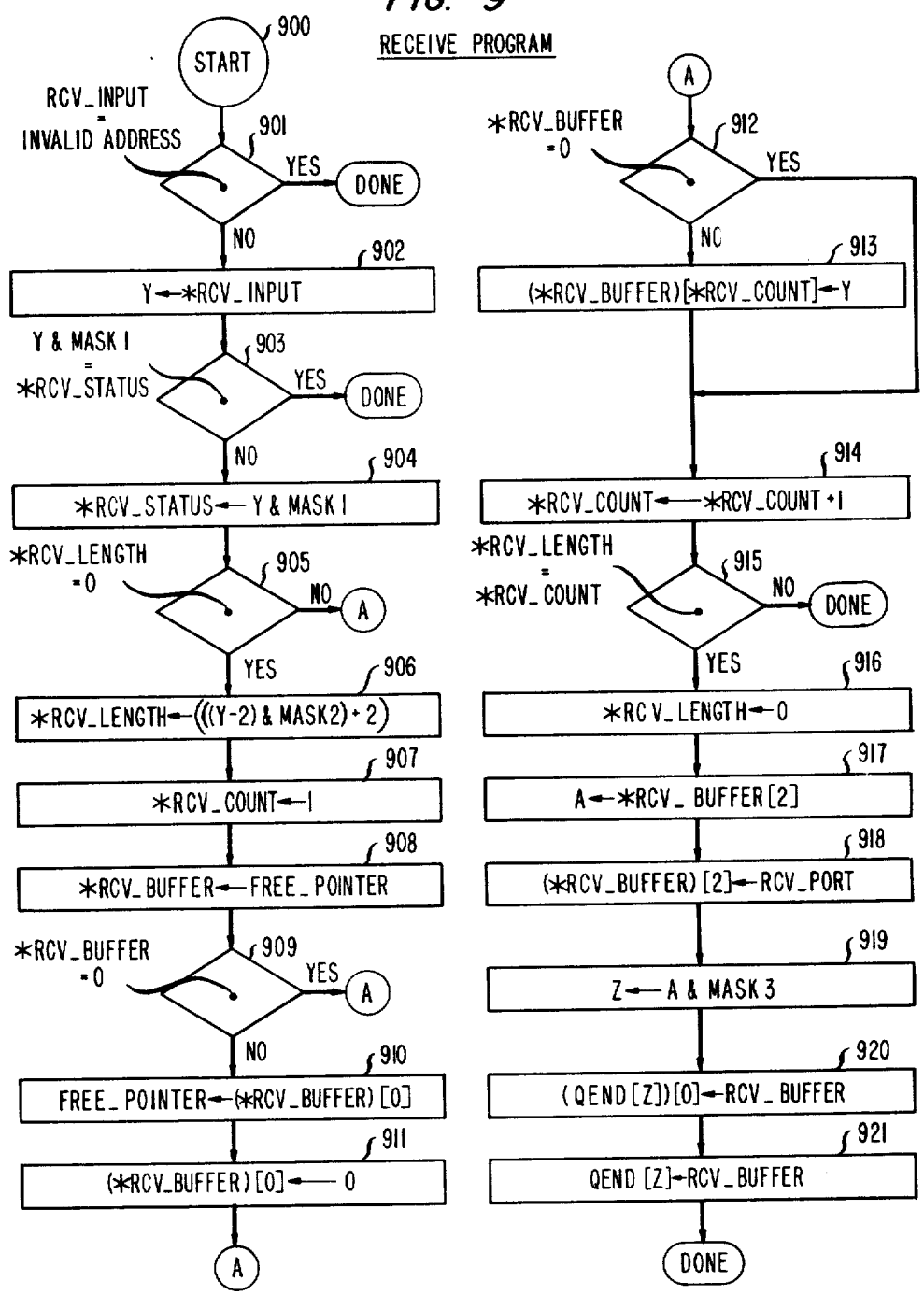
FIG. 9 is a flowchart which represents the receive program.
Figure 10:
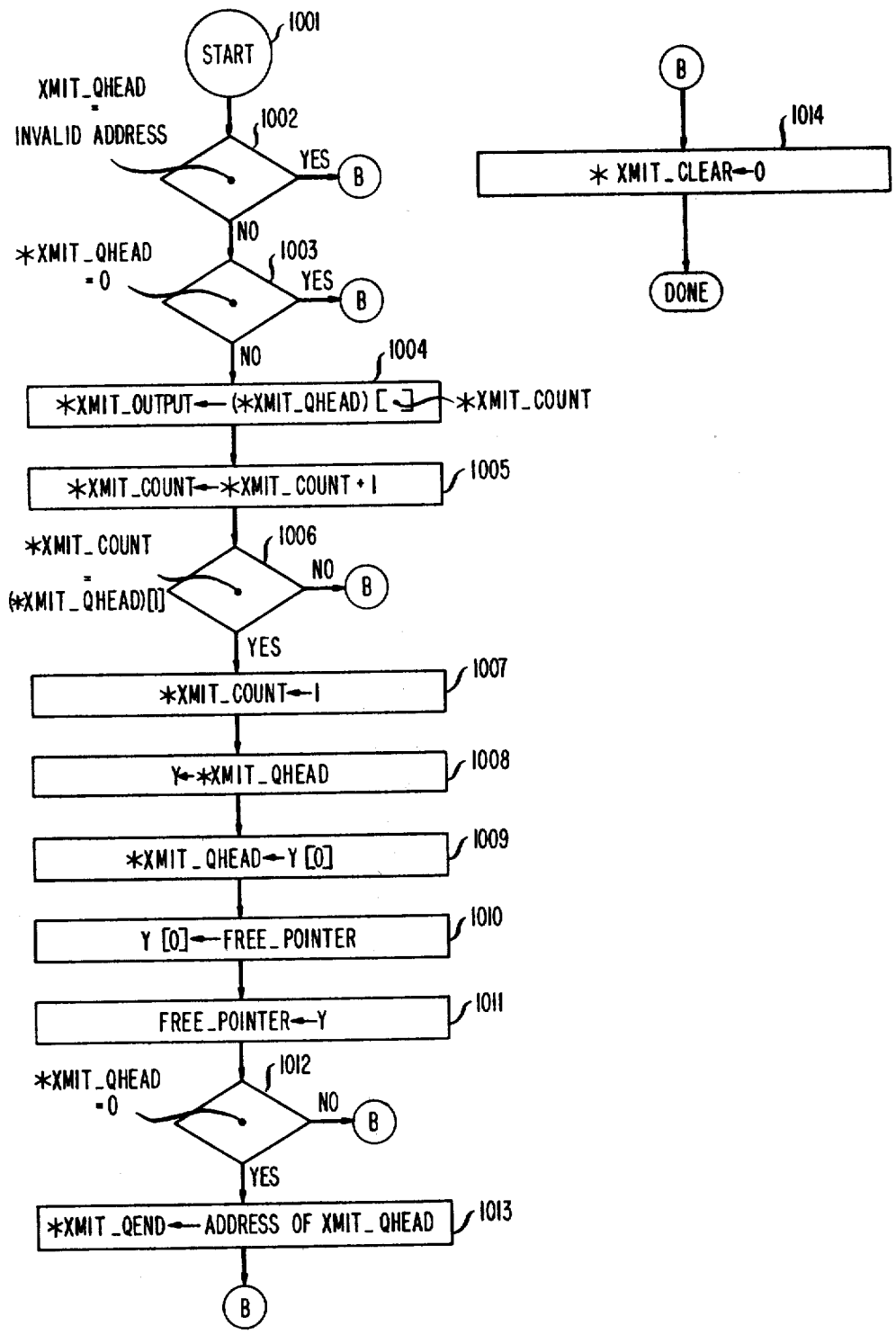
FIG. 10 is a flowchart which represents the transmit program.

The foregoing example describes the steps for servicing one transmitting and one receiving terminal. The following describes how the switching system of FIG. 1 services a number of active data terminals. Processor 117 of FIG. 1 performs operations on packets by time sharing a receive program and a transmit program among terminals. Each of these programs as illustrated in FIGS. 9 and 10, is executed once per time frame. Processor 122 of FIG. 1, under program control, designates in each time frame which terminals are to be serviced and the location of data associated with these terminals in memories 114, 116 and 119. Processor 122 designates data terminals by transmitting words which are commonly called parameters to processor 117 via memory 119. These parameters are data words as well as addresses for words already stored in data memory 119 for use with the operations described in the discussion of FIGS. 2 through 5.

Figure 6:
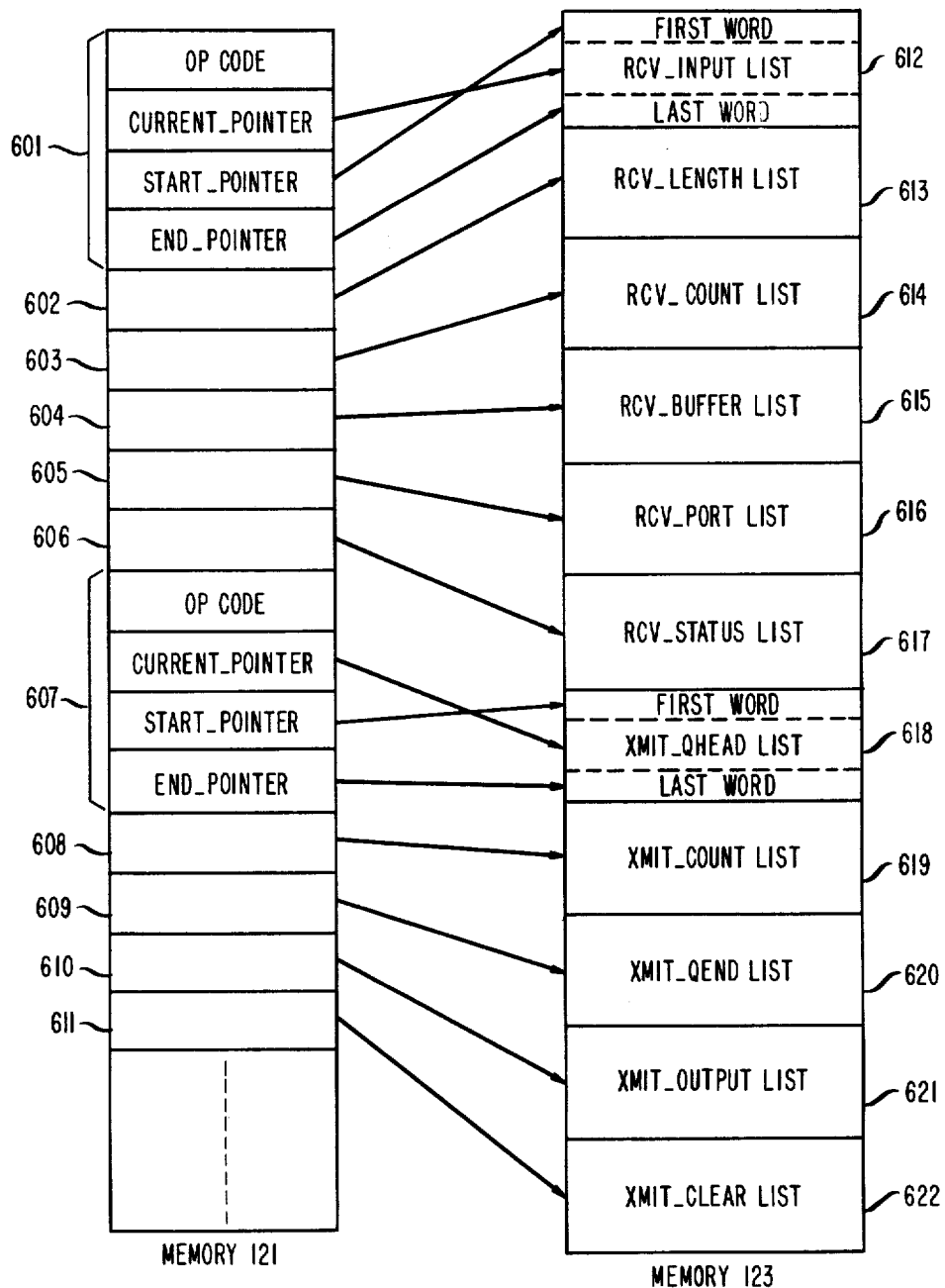
FIG. 6 shows memory maps for memories 121 and 123 and the relationship between different sections of these memories.

FIG. 6 depicts a group of program instructions 601 through 611 stored in PP program memory 121 of FIG. 1 and a list of parameters 612 through 622 stored in PP data memory 123 under control of the common control 120 of FIG. 1. Common control 120 controls the servicing of data terminals by storing the appropriate instructions in memory 121 and appropriate parameters in memory 123. Processor 122 illustratively executes 256 program instructions stored in PP program memory 121 of FIG. 1 during each time frame. Each of these instructions is capable of reading or writing from or to both memory 119 and memory 123 within the execution of the same instruction. A parameter is passed by processor 122 first reading it from memory 123 and then writing it into memory 119. A memory layout with respect to these parameters and instruction to be executed by processor 122 is shown in FIG. 6. Each type of parameter is grouped within a particular list in memory 123 and there is one processor 122 instruction associated with each list. For example, the parameter which is used to specify the address of the word in input memory 114 is contained within the RCV INPUT list 612 and instruction 601 is associated with this list. There are six lists used by the receive program which are lists 612 through 617, and there are five lists used with the transmit program which are lists 618 through 622. The words contained in receive lists 613 through 620 are addresses which the intelligent processor 117 uses to access a data word in data memory 119, whereas, words in lists 612 and 622 are used by processor 117 to address memory 114 and to define the transmitting terminal. For example, a word in RCV LENGTH list 613 is an address of a word in data memory 119 which defines the total number of words in a packet which is presently being assembled.

In each time frame, processor 122 executes instructions 601 through 611, and the execution of these instructions moves one word from each of the lists 612 through 622 into memory 119. Each of the instructions 601 through 611 has the same four-element format as shown for instructions 601 and 607. As illustrative of how these instructions operate, consider the operation of instruction 601. When instruction 601 is first executed, the CURRENT POINTER is equal to the START POINTER, which means that both pointers are pointing to the first word of list 612. As instruction 601 is executed, the CURRENT POINTER is incremented for each execution; and a word is read from list 612 and stored into memory 119. After the last word has been read from list 612 and written into memory 119, the CURRENT POINTER equals the END POINTER. When CURRENT POINTER equals the END POINTER, the CURRENT POINTER is set equal to the START POINTER; and the transfer of the list is repeated since the CURRENT POINTER now points to the first word of RCV INPUT list 612.

The determination of where in memory 119 processor 122 is to store a word is dictated by the contents of list 612. It is important to understand the manner in which processor 122 accesses memory 119. Within memory 119, there is illustratively two blocks of 256 words dedicated to communication between processor 122 and processor 117. These two blocks are illustrated in FIG. 12 as parameter block 1201 and parameter block 1202. When counter 115 of FIG. 1 indicates an even time frame, processor 122 writes into parameter block 1201 as indicated by the solid lines from instructions 601 through 611 as shown on FIG. 12. When block 115 indicates an odd time frame, processor 122 writes into parameter block 1202 as shown by dashed lines in FIG. 12. Processor 117 always reads or writes the other block which processor 122 is not using. Details of the structure of memory 119 for implementing the writing of these parameter blocks is given in a later section. This mechanism allows processor 122 to set up completely the parameters in memory 119 for a time frame before processor 117 starts that frame.

As illustrated by FIG. 12, an instruction's position in memory 121 determines which word in memory 119 it writes, but the word which an instruction reads from memory 123 is determined by the CURRENT POINTER word of the instruction. As shown in FIG. 12 for example, instruction 601 writes into either the first word of parameter block 1201 or 1202.

The number of words in the lists 612 through 622 shown in FIG. 6 depends on the data rate of the terminals which are being serviced. The number of words in each of the receive lists 612 through 617 are equal since one word from each list is written into memory 119 during every time frame. Similarly, the number of words in the transmit lists 618 through 622 are also equal, since, again, one word from each list is written into memory 119 during every time frame. However, since the receive program may be dealing with different terminals than the transmit program, the number of words in the receive lists does not have to equal the number of words in the transmit lists.

The rate at which a terminal is serviced is specified by the parameters are passed to the receive or the transmit program via memory 119 from the list in memory 123. For example, if a terminal is transmitting at 960 characters per second, then the terminal must be serviced by the receive program every eight time frames; however, if a terminal is transmitting at 480 characters per second, the terminal must be serviced every 16 time frames. Since terminals transmitting at 480 characters per second only have to be serviced half as much as terminals transmitting at 960 characters per second, one receive program may handle 16 terminals transmitting at 480 characters per second as opposed to handling eight terminals transmitting at 960 characters per second. In addition, one receive program may service terminals which are operating at different data rates.

For example, consider a situation where one receive program is to service nine terminals. Assume that terminals 111 and 124 of FIG. 1 are transmitting at 480 characters per second, whereas, seven other terminals including terminals 110 and 125, are transmitting at 960 characters per second.

Figure 7:
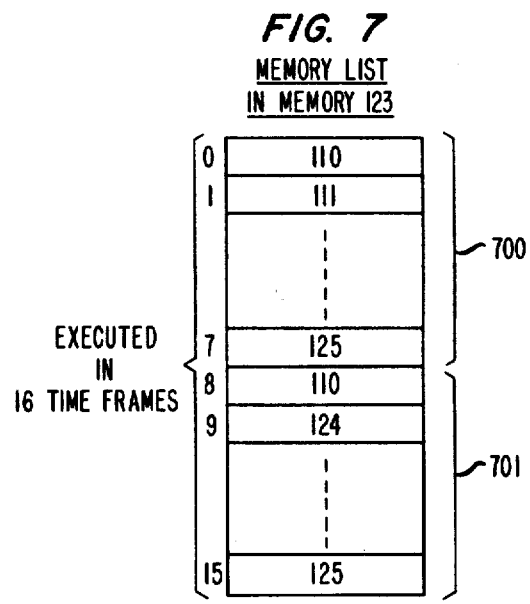
FIG. 7 illustrates the typical contents of a section of memory 123 as shown in FIG. 6.

FIG. 7 is illustrative of the contents of each of the lists 612 through 617 of FIG. 6 which are included in memory 123. Each of the lists 612 through 617 would contain 16 words. If the memory layout shown in FIG. 7 is for the RCV INPUT list 612 of FIG. 6, then word "0" addresses the word in input memory 114 associated with terminal 110, and word "1" addresses the word in input memory 114 associated with terminal 111. The 16 words which make up each list are sequentially transmitted to memory 119 at a rate of one word per time frame. In group 700, the parameter for terminal 111 is transmitted to memory 119 when word "1" is transmitted; and in group 701, the parameter associated with terminal 124 is transmitted to memory 119 when word "9" is transmitted. The result is that terminals 111 and 124 are only serviced once for every 16 time frames. In FIG. 7, only the words associated with terminals 110, 111, 125, and 124 are shown for brevity.

Figure 8:
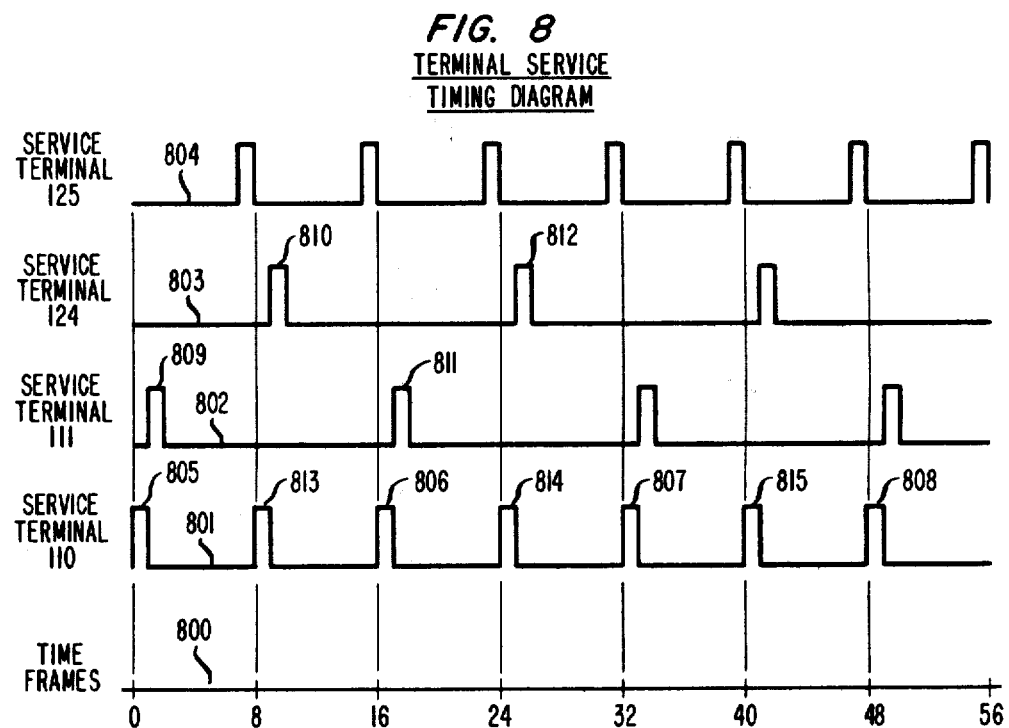
FIG. 8 is a timing diagram which illustrates the servicing of terminals in relation to FIG. 7.

FIG. 8 illustrates the time frames in which terminals 110, 111, 124, and 125 are serviced for the repeated transmission of the list defined by FIG. 7. A positive pulse on lines 801 through 804 indicates that the terminal associated with that line is being serviced during that time frame. Lines 801 and 804 of FIG. 8 illustrate the fact that terminals 110 and 125 are serviced every eight time frames, whereas lines 803 and 802 illustrate that terminals 124 and 111 are serviced every 16 time frames. In each group of eight time frames, six additional terminals are serviced. The servicing of the terminals shown in FIG. 8 will continue until the words of the list give in FIG. 7 are modified by common control 120.

With respect to line 801 of FIG. 8, word "0" of the list given in FIG. 7 causes processor 117 to service terminal 110 during periods 805, 806, 807 and 808; and word "8" of FIG. 7 causes processor 117 to service terminal 110 during periods 813, 814 and 815. Word "1" of FIG. 7 causes terminal 111, as shown in line 802, to be serviced during periods 809 and 811; whereas word "9" of FIG. 7 causes terminal 124, as shown in line 803, to be serviced during service periods 810 and 812. The previous description shows the repetitive nature of the continuous retransmission of the words of FIG. 7 to memory 119 by processor 122.

Lists 618 through 622 of FIG. 6, which are used for transmit program, have a similar relationship to the data transmission rate of the terminal, as do the lists associated with the receive program. It is important to realize that there is no fixed relationship between the receive list data rates and the transmission list data rates.

The receive program is illustrated as a flowchart in FIG. 9. This program is stored in memory 118 and controls the operation of processor 117. As previously described in the discussion relating to FIG. 8 and FIG. 7, this program can be time-shared to service a number of data terminals. The time-sharing is implemented by different parameters from the lists of memory 123 as shown in FIG. 6 being transferred to memory 119 during each time frame. In any particular time frame, the receive program is only servicing one data terminal, and it does this by referencing parameters which are stored in the memory 119. Each parameter which is stored in memory 119 is designated by the name of the list from which it was selected. For example, when a parameter is moved from the RCV INPUT list 612 of memory 123 to memory 119, it is referenced in memory 119 by the designation RCV INPUT. The words from RCV STATUS, RCV LENGTH, RCV COUNT and RCV BUFFER lists of FIG. 6 are address pointers which point to the location of the desired data word in memory 119. The word in the RCV PORT is used as data and the word from RCV INPUT is an address pointer to a word in memory 114.

Nomenclature used with respect to FIG. 9 is now explained. In FIG. 9, RCV BUFFER designates the parameter which was transmitted from the RCV BUFFER list 615 and stored in memory 119; whereas, *RCV BUFFER designates that this parameter is used as a pointer to a word in memory 119 and *RCV BUFFER represents the contents of that word. When RCV BUFFER is used as a pointer, the parameter content thereof is used as an address rather than as data. The parameter, RCV BUFFER, is the address for the buffer which is being used to store the data words being transmitted by a terminal. The designation (*RCV BUFFER)[0] refers to the first word of the buffer designated by the parameter RCV BUFFER. The notation (*RCV BUFFER) references the start of the buffer and the numerical value inside the brackets determines what word of the buffer is to be referenced in a particular operation. This nomenclature is also used with respect to RCV INPUT, RCV STATUS, FREE POINTER, RCV PORT, RCV COUNT and RCV LENGTH.

To illustrate the operation of the receive program, consider the previous example which was described with respect to FIGS. 2 through 5. Block 901 checks to make sure that the address defined by RCV INPUT refers to a valid word in memory 114. If the receive program is to be inactive in this time frame, an invalid address will be passed by processor 122 in the RCV INPUT parameter. If the address is invalid, block 901 results in no further useful work being done by the receive program.

If block 902 is executed, the word from the terminal is read from memory 114 at the address defined by RCV INPUT; and block 903 checks to ascertain if this is a new data word from the data terminal or an old word. Each time the DIU receives a data word from the terminal, it changes the state of the control sample bit from its previous value. The receive program always retains the state of the control sample bit from the last data word which it processed from the data terminal in *RCV STATUS. Block 903 provides a check so that the receive program only processes new data words by comparing the present state of this control sample bit with the stored state in *RCV STATUS.

If the two states are not equal, a new data word is present in memory 114. If a new data word is present, the new state of the control sample bit is written into *RCV STATUS in block 904. Block 905 is next executed which checks to see if RCV LENGTH, which defines the length of the packet, is equal to zero. If the packet length is not equal to zero, blocks 906 through 911 are not executed since the present data word is not the first word of a new packet.

If the packet length is equal to zero, this indicates that the present data word is the first word of a new packet and that a buffer must be assigned from the free buffer queue to assemble this new packet as described in the discussion of FIGS. 2 and 3. This assignment of a buffer from the free buffer queue plus the updating of RCV LENGTH and RCV CONNT is accomplished by blocks 906 through 911. The first word of a packet defines the data length, and this word is stored into *RCV LENGTH by block 906. Block 907 updates *RCV COUNT to be a "1" since one word of the packet has been received. As shown in FIG. 2, the FREE POINTER is pointing to an idle buffer which is to be seized by the receive program and used as the buffer for storing the incoming packet. This is accomplished by block 908 placing the FREE POINTER into *RCV BUFFER. Block 909 checks the make sure that the *RCV BUFFER is not equal to zero which would indicate that there were no free buffers available. If there are no free buffers available, block 912, as will be described shortly, will prevent the overwriting of any memory locations by the receive program. Assuming that there was a buffer available, block 910 then updates the FREE POINTER to point to buffer C which was the second free buffer in the free list as shown in FIG. 3. Block 910 takes the first word of buffer B which is pointed at by (*RCV BUFFER)[0] and places it in FREE POINTER. so that the FREE POINTER points to buffer C which is the next free buffer in the free buffer queue. Block 911 sets the first word of the seized buffer B equal to a zero which indicates that this will be the last buffer in any list in which it may be inserted. After block 911 has been executed, the buffers are in the state shown by FIG. 3.

Block 912 is executed next to assure that if no buffer had been available to assign to this packet which is indicated by *RCV BUFFER pointing to a location which is not a valid address for a buffer, then block 913 is not executed. The erroneous execution of block 913 would result in data being written into the wrong location in memory 119. If block 913 is executed, then the word is written into buffer B at the location defined by the *RCV COUNT. For the second word of the buffer, *RCV COUNT is a "1"; hence, word 1 of buffer B has the length of the packet written into it. Block 914 updates the count of the data words, *RCV COUNT, which have been received, and block 915 compares this with the maximum number of expected data words in the packet which is given by *RCV LENGTH. If the full packet has not been received, then the program is done for this particular time frame.

After the whole packet has been received, the receive program will execute blocks 916 through 921. The purpose of these blocks is to add buffer B onto the transmit queue was described in the discussion of FIG. 4. As an initialization step, block 916 makes *RCV LENGTH equal to zero so that when the next new packet is started, block 905 will be properly executed. Blocks 917 and 918 place the transmitting data terminal number into the third word of buffer B so that the receiving data terminal can identify the transmitting data terminal.

Blocks 920 and 921 are concerned with placing buffer B into the transmit list by updating the first word or buffer G which is the last buffer in queue buffer awaiting transmission to the receiving terminal to point to buffer B which is done by block 920; and by updating the XMIT QEND word to point to buffer B which is done by block 921. The XMIT QEND words are arranged in a QEND array which is indexed on the basis of the port number with the starting address of the array being symbolically defined as QEND. In block 920, QEND[Z][0] refers to the buffer pointed to by the XMIT QEND word in the QEND array whose port number is equal to Z. Block 921 is more straightforward, since QEND[Z] just defines a memory location in the QEND array which is loaded with the address in RCV BUFFER.

The transmit program, which is illustrated as a flowchart in FIG. 10 and is stored in memory 118, is time-shared among a number of packets awaiting transmission to terminals. This time sharing is controlled by parameters from lists 618 through 622 of FIG. 6 which are passed through the memory 119 by processor 122 to processor 117. To illustrate the operation of the transmit program, assume the packets to be transmitted are configured as shown in FIG. 4 for the particular time frame in which the program is now executing. Block 1002 checks to make sure that the XMIT QHEAD is a valid address for a XMIT QHEAD parameter. If the parameter is an invalid address, it indicates that the transmit program is to do no useful work in this time frame.

Block 1003 checks to ascertain that the *XMIT QHEAD is pointing to an actual buffer. If the *XMIT QHEAD contains a zero, it indicates that at this point in time there is no packet ready to be transmitted. If no packet is available for transmission, it means that the receive program has not completed the packet. If there is a fully assembled packet awaiting transmission, block 1004 is executed. Block 1004 reads a word from buffer D in data memory 119 as defined by (*XMIT QHEAD) [XMIT COUNT] and writes this word into the memory location in output memory 116 defined by *XMIT OUTPUT. Block 1005 causes *XMIT COUNT to be incremented by one.

Block 1006 checks to see if the whole packet has been transmitted by comparing the packet length which is defined by (*XMIT QHEAD)[1] with the number of already transmitted words which is defined by *XMIT COUNT. If words still remain to be transmitted, then the program has no further work to do and is done for this particular time frame.

If the entire packet has been transmitted, then blocks 1007 through 1013 must be executed, and the resulting configuration in memory 119 is shown in FIG. 5. At the start of the execution of blocks 1007 through 1013, memory 119 is configured as shown in FIG. 4. Blocks 1007 through 1013 result in buffer D being returned to the free list, and the *XMIT QHEAD being updated to point to the first word of buffer G. Block 1007 initiates *XMIT COUNT to one in order to be prepared to handle a new packet. Block 1008 temporarily stores the address contained in *XMIT QHEAD in register Y. Y now contains the address for the first word of buffer D. Word 0 of buffer D contains the address for buffer G, and block 1009 stores this address for buffer G into *XMIT QHEAD since the packet in buffer G will be transmitted next. Blocks 1010 and 1011 return buffer D to the free list. The first buffer on the free list is presently buffer C, and the FREE POINTER points to buffer C as shown in FIG. 4. Block 1010 writes the address of the FREE POINTER into the first word of buffer D, and the address contained in register Y is placed into the FREE POINTER.

Block 1012 and 1013 are not related to the example of FIGS. 4 and 5, but are intended to account for the situation when all the buffers awaiting transmission have been transmitted and the *XMIT QHEAD contains a "0". *XMIT QHEAD containing a "0" would result from the execution of block 1009 if the buffer returned to the free list was the last buffer waiting transmission. The last buffer will always contain a zero in the first word of the buffer, indicating that it is the last buffer. Block 1013 merely accomplishes the object of causing the receive program to make the *XMIT QHEAD point to the next buffer which the receive program will fill with a packet for transmission.

Block 1014 merely sets to zero, a memory location in output memory 116, which had been serviced by this particular transmit routine in another time frame. This is necessary, since when a word is read from output memory 116, it is not set to zero by the distributor 113.

Appendix A details the source code instructions for the receive program given by the flowchart of FIG. 9, and Appendix B details the source code instructions for the transmit program given by the flowchart of FIG. 10. The source code instructions used are defined in the previously mentioned patent of Alles, and the comments in the programming code refer to the appropriate blocks on the flowcharts as indicating the purpose of the various section of code. The comments include all information following the "1" symbol on any given line.

A detailed block diagram of parameter processor 122, PP program memory 121, and PP data memory 123 is shown in FIGS. 13 and 14. Processor 122 executes instructions stored in memory 121 and reads data from memory 123. Memory 121 comprises elements 1408 through 1411, and memory 123 comprises elements 1312 through 1315. The remaining elements on FIGS. 13 and 14 comprise processor 122. With respect to processor 122, time counter 1413 and timing decoder 1412 supply all the necessary timing information for processor 122. Control is provided by the execution of a microprogram stored in microcontrol memory 1405 in response to an OP code read from memory 121.

Processor 122 has various registers for temporary storage. C register 1301 is used to generate and to store constants for an execution of the microprogram. Data register 1302 stores words which are transmitted from memory 119 via data-in buffer 1311. A register 1303 and B register 1304 are used to store words which are read from control memory 1408, and ALU register 1306 is used to store the results from ALU 1307.

Selector 1305 selects the source for the A input of ALU 1307, and selector 1326 selects the B input for ALU 1307. Under microprogram control, A flag 1401 and B flag 1402 store the results of a comparison performed in ALU 1307. Polling logic 1403 under microprogram control stores the contents of either A flag 1401 or B flag 1402 and the contents of time counter 1413. Logic 1403 is used to notify common control 120 that processor 122 is requesting service and designates the time frame which needs servicing.

Control information for the various elements of processor 122 is provided by the microcontrol bits C1 to C32 which are generated by control register 1404 and microcontrol memory 1405.

Memory 121 is accessed either by common control 120 or processor 122. Control 120 is allowed to access memory 121 via bus 126 at time T6 which is generated by timing decoder 1412. During this time, microprogram bits C3 and C4 condition selector 1409 to receive data from control 120 via cable 1415. Control logic 1410 is conditioned by the T6 signal to accept the read or write signal transmitted via cable 1414 from control 120, and the control logic 1410 conditions output selector 1411 to receive the address being transmitted from control 120 via cable 1416. The read or write signal transmitted via cable 1414 determines whether control memory 1408 will be read or written during time T6. Processor 122 can access memory 121 at any time other than time T6. The accessing of memory 121 by processor 122 will be described in greater detail in the following paragraphs.

Memory 123 can be accessed either by control 120 or processor 122. Control logic 1314 determines whether the processor 122 or the control 120 will be granted access when the control 120 requests access via cable 1321 or processor 122 requests access via conductors 1323 or 1324. Control logic 1314 properly conditions selectors 1312 and 1315 to receive the address and the data from the proper source, respectively. The address from control 120 is transmitted via cable 1322, and the data is transmitted via cable 1319. The address from processor 122 is transmitted from address register 1316.

Control 120 can also read the state of the logic 1403 by transmitting a request via conductor 1324. Logic 1403 responds to this request by transmitting, via cable 1325 the state of the request flag and the previously stored information from the time counter 1413. After logic 1403 has transmitted the necessary information, it resets the request flag.

As previously described, processor 122 executes 256 instructions during each time frame. Time counter 1413 generates 256 time periods per time frame, and one instruction is executed during each time period. All of processor 122's instructions consist of four words. An example of these instructions is illustrated by instruction 601 of FIG. 6. The instructions are stored in control memory 1408 and are accessed by time counter 1413 via bus 1418. Each instruction is executed during eight timing periods which are generated by timing decoder 1412. The least significant bits of time counter 1413 are transmitted via bus 1419 to timing decoder 1412, and these bits determine the eight time periods.

During the first period T0, the OP code is read from control memory 1408 and stored in OP code register 1406. The contents of OP code register 1406 are then used to form the most significant address bits for microcontrol memory 1405. The least significant address bits for microcontrol memory 1405 are provided by time counter 1413. Eight microcode words are accessed from microcontrol memory 1405 and stored in control register 1404 for each instruction read from control memory 1408.

The output of control register 1404 is the microprogram bits C1 through C32 which are used to control the various elements in the processor 122 including the two least significant address bits for control memory 1408. The control of the two least significant address bits of control memory 1408 allows the microprogram to randomly access the four words of the instruction stored in memory 1408 which is presently being executed.

The format of the microprogram word is shown in FIG. 15. Micro-instructions 1501 through 1516 represent individual micro-instructions which are stored in microcontrol memory 1405. The column entitled Microcontrol Memory Address gives the address for each of the instructions in microcontrol memory 1405. The columns entitled PP Program Memory define the microcode bits, C1 through C6, which are associated with the control of PP program memory 121. The entries in the PP Program Memory columns are in symbolic notation; however, it should be apparent to one skilled in the art how to convert these symbolic notations into actual binary codes for microcode bits C1 through C6.

The columns entitled ALU define the sources of the operands for ALU 1307 and the arithmetic functions which ALU 1307 performs. These entries are also in symbolic notation.

The columns entitled Flag Control specify the updating of A flag 1401 and B flag 1402. When specified, the contents of a particular flag is set equal to the output of the equal output terminal of ALU 1307 which is transmitted via conductor 1318 to flags 1401 and 1402. An example of the nomenclature used in the Flag Control columns is illustrated by micro-instruction 1506, the "1" in column A means that the equal output of ALU 1307 is inserted into A flag 1401 at the end of the execution of micro-instruction 1506.

The columns entitled Register Control are used to define what registers will be activated during a particular instruction. For example, the "1" in subcolumn B of micro-instruction 1502 indicates that the information being transitted from the output of control memory 1408 via bus 1317 is to be stored in B register 1304 at the end of this micro-instruction.

The column entitled C Register Content is used to define the actual contents which will be loaded into the C register at the end of an instruction. For example, micro-instruction 1502 designates that a zero will be loaded into the C register. The columns entitled Polling Logic indicate whether A flag 1401 or B flag 1401 will be inserted into the polling logic 1403. The column entitled PP Data Control indicates when a read or write is to be performed on PP data memory 123. The column entitled Flag Reset determines when the A or B flags will be reset to "0".

An example is now utilized to demonstrate the application of the microcode instructions given by FIG. 15 to control of processor 122, PP data memory 123, and PP program memory 121 as shown in FIGS. 13 and 14. This example explains in further detail the previous example which was described with respect to FIGS. 7 and 8. For this example, the appropriate contents of control memory 1408 and memory 123 are shown in FIGS. 16 through 19. Block 1601 shows the instruction which is stored in control memory 1408, and block 1602 shows a parameter list similar to that shown in FIG. 7 wich is stored in memory 1313 of memory 123. The instruction shown in block 1601 is presently being accessed from the control memory 1408 at time T0. The OP code is loaded into OP code register 1406. OP code bits 11 through 15, in conjunction with the least significant bits from time counter 1413, address microcontrol memory 1405 and access the microcode instruction 1502 which is written into control register 1404.

At time T1, microcode instruction 1502 reads the POINTER word, which contains a 14, from block 1601 and stores this word in register B 1304. Instruction 1502 also places a "0" into the C register 1301.

At the start of T2, microcode instruction 1503 is read from microcontrol memory 1405 into control register

1404. Microcode instruction 1503 adds B register 1304 and C register 1301 together and stores the result in address register 1316 where it will be used to access memory 1313. In addition, microcode instruction 1503 starts the accessing of memory 1313 which will be completed at time T6. The word accessed from memory 1313 is defined by the contents of address register 1316. The word being accessed by memory 1313 is word 14 of block 1602 for purposes of this example. Also, microcode instruction 1503 accesses the END word, which contains a 15, from block 1601 and stores it in A register 1303. In addition, the contents of the C register are updated to contain a "1".

At the start of time T3, microcode instruction 1504 is fetched from microcontrol memory 1405 and stored in control register 1404. Microcode instruction 1504 increments the pointer which is stored in B register 1304 by adding B register 1304 and C register 1301 together.

During time T4, microcode instruction 1505 is accessed, and it continues to add the B register 1304 and C register 1301 together and writes the results of this addition into the pointer word of block 1601. Also, microcode instruction 1505 writes the results of the addition into ALU register 1306.

During time T5, microcode instruction 1506 compares the contents of A register 1303 which contains the END word from block 1601 with the contents of the ALU register 1306 which contains the POINTER word. For the present example, the A register 1303 equals the ALU register 1306; hence, ALU 1307 transmits a "1" from the equal terminal via conductor 1318 to A flag 1401p which stores the "1" under control of microcode bit C31.

During time T6, the common control is given access into memory 121. The only operation performed by processor 122 during T6 is to store the output of memory 1313 into the data-out register 1310.

During time T7, the OP CODE word of block 1601 is written with the output of buffer 1407. The output of buffer 1407 is equal to that shown for the OP CODE of block 1601 with the exception that bit 15 which is the output of A flag 1401 is now equal to a "1" since bits 15 and 14 are controlled by the states of the A and B flags 1401 and 1402, respectively. Microcode instruction 1508 writes the output of buffer 1407 into control memory 1408. The contents of the instruction in control memory 1408 at the end of time T7 is shown by block 1701 of FIG. 17.

During the next time frame, the instruction shown in block 1701 will be executed. Since the five most significant bits of the OP CODE word of block 1701 form the address for microcontrol memory 1405, word 231 will be accessed during time T1 rather than word 31 from memory 1405. Microcode instructions 1510 and 1511 perform the same operations as microcode instructions 1502 and 1503 of the previous paragraphs. These operations are to start the accessing of word 15 of block 1702. This word will be loaded into the data-out register 1310 by microcode instruction 1515. However, microcode instruction 1511, rather than accessing the END word of block 1701, accesses the START word of block 1701 and stores this word in A register 1303.

At time T3, microcode instruction 1512 adds the A register 1303 to the C register 1301 which contains a zero. The purpose of this addition is simply to transfer the contents of A register 1303 through selector 1305 and ALU 1307 to the input of selector 1409 where it can be written into memory 1408 during time T4.

At time T4, microcode instruction 1513 writes the contents of A register 1303 which contains the start address of block 1701 into the POINTER word of 1801. At time T5, microcode instruction 1514 resets A flag 1401 as indicated by the Flag Reset A column containing a "1". Microcode instruction 1515 has been previously described.

At time T7, microcode instruction 1516 writes the output of buffer 1407 into the instruction word. At the end of time T7, the contents of the instruction in control memory 1408 is shown by block 1801 of FIG. 18.

During the next time frame, the instruction which is executed, is shown in block 1801; and this instruction causes microcontrol memory 1405 to access microcode instruction 1502. At the end of the execution, the instruction will have been modified as shown in block 1901 of FIG. 19.

Figure 11:
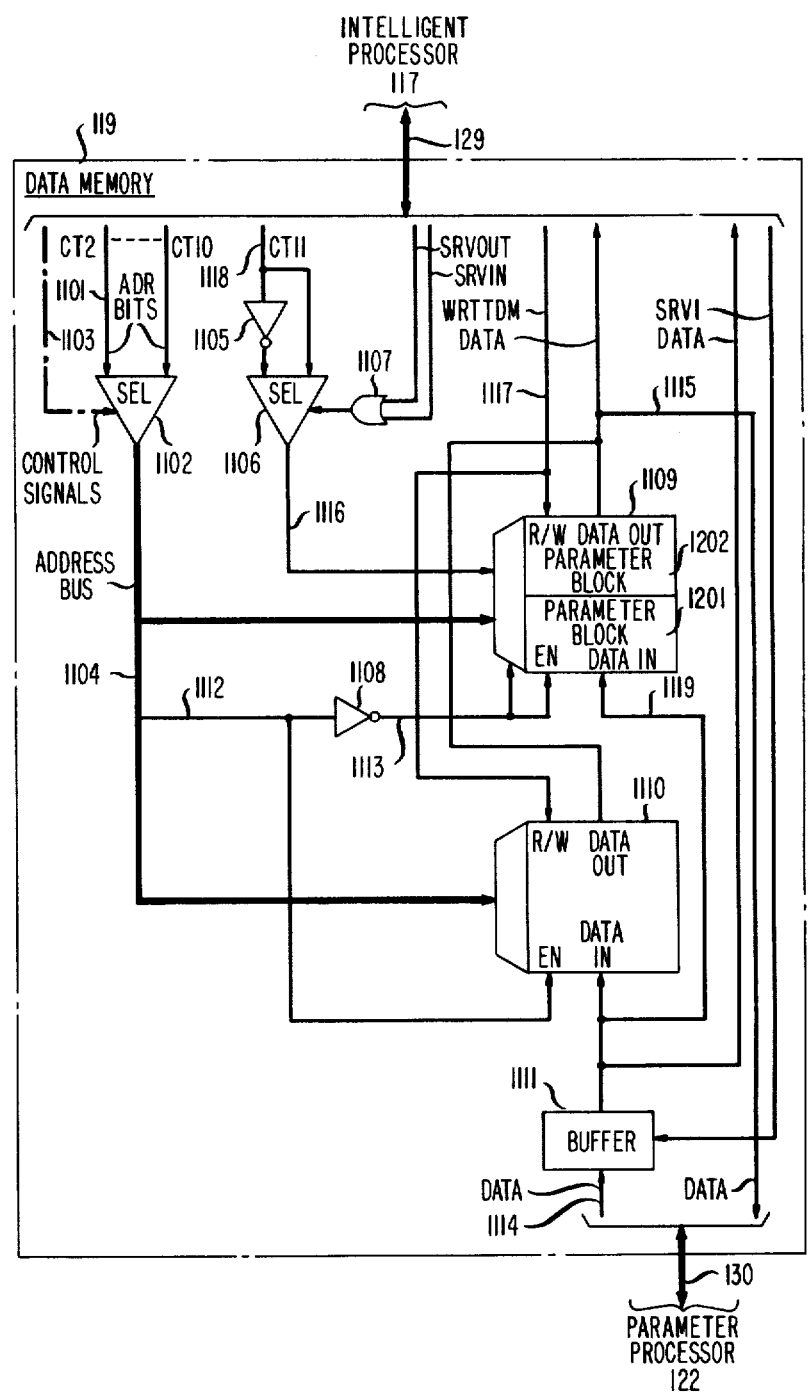
FIG. 11 is a detailed block diagram of data memory 119.

A detailed block diagram representing data memory 119 is shown in FIG. 11. The elements of FIG. 11 are described in the previously mentioned Alles patent with the exception of elements 1105 through 1110. These modifications are required in order that processor 122 can be loading one parameter block of memory 1109 with new parameters while processor 117 is using parameters stored in the other parameter block of memory 1109. Elements 1109 and 1110 are two separate memory arrays used in place of the one memory array of the Alles patent. All control signals and address bits shown in FIG. 11 with the exception of those on buses 1114 and 1115 are generated by processor 117.

As previously discussed with respect to FIG. 12, the parameters coming from processor 122 are stored into memory locations in memory 119 at address locations associated with instructions being executed by processor 122 and there are 256 instruction executions per time frame. Each instruction is associated with a time period which is defined in processor 122 by the most significant bits of time counter 1413 of FIG. 14 which are transmitted via cable 1418. The address information defining time periods is generated by processor 117 as bits CT2 through 10 which are transmitted via bus 1101, and the information transmitted via bus 1101 equals that transmitted via cable 1418. During the time allowed for processor 122 to access memory 1109, processor 117 generates the correct control signals on bus 1103 so that selector 1102 selects bits CT2 through 10 as the address bits for memory 1109. Selector 1103 transmits these bits on address bus 1104 to memories 1109 and 1110.

The most significant bit on address bus 1104 is used to select whether memory 1109 or memory 1110 should be accessed. This determination is made on the state of the most significant bit which is transmitted via conductor 1112 to memory 1110 and to memory 1109 via inverter 1108 and conductor 1113. If the most significant bit is a "1" then memory 1110 will be accessed, otherwise memory 1109 will be accessed.

The most significant address bit for memory 1109 which is controlled by bit CT11 on conductor 1118 is transmitted via selector 1106 and conductor 1116. This address bit determines whether parameter block 1201 or 1202 is accessed in memory 1109. Parameter block 1201 is the lower half of memory 1109 and parameter block 1202 is the upper half of memory 1109. During any time frame, the purpose of this most significant address bit is to determine which half of memory 1109 is to be accessed by the processor 117 and which half is to be accessed by the processor 122. This determination is made on the basis of bit CT11. Bit CT11, which is transmitted via conductor 1118, indicates whether the time frame is an odd or an even time frame. Inverter 1105 inverts the state of bit CT11. Selector 1106 selects either the inverted or non-inverted state of bit CT11 to transmit to memory 1109. Control signals SRVOUT and SRVIN are used to control selector 1106, and processor 117 generates either SRVOUT or SRVIN when processor 122 is to have access to memory 1109. Gate 1107 performs the OR function on signals SVOUT and SRVIN and transmits its output to the control input of selector 1106. If this control input is a "1" indicating that processor 122 is to access memory 1109, then the CT11 bit will be transmitted on conductor 1116; but if the output of Gate 1107 is a "0" indicating that processor 117 is to access memory 1109, then the output of inverter 1105 will be transmitted on conductor 1116. The result of this selection process is that when processor 122 is to access memory 1109 then the CT11 bit is used directly as the most significant address bit; however, when processor 117 is to address memory 1109, then the inverted state of the CT11 bit is used as the most significant address bit for memory 1109. Hence, in any given time frame, processor 117 and processor 122 are accessing different halves of memory 1109.

The information which is transmitted from the processor 122 on bus 1114 is written into memory 119 during each time period in synchronization with the program which is being executed in processor 122. This write operation is accomplished by processor 117 transmitting a write pulse, WRTTDM via conductor 1117 at the appropriate times and transmitting bits CT2-10 as the address for memory 1102. The CT2-10 bits are identical to those bits generated and transmitted on cable 1418 by the time counter 1413 of FIG. 14. Hence, as the parameters are generated in processor 122 and stored in the data-out register 1310 of FIG. 13, they are written into the appropriate memory word of memory 1109. This write operation takes place at the end of each instruction executed in processor 122. The data which is transmitted from processor 122 via bus 1114 is buffered by buffer 1111 and is allowed on to the data-in bus 1119 when processor 117 makes the SRVIN signal a "1" which enables buffer 1111.

It is to be understood that the above-described embodiment is merely illustrative of the principles of the invention and that other arrangements may be devised by those skilled in the art without departing from the spirit and scope of the invention.

APPENDIX A

Receiving program:

```
                              /900Start
mov rcv input→B
alu B→(Z,Y,C)                 /901rcv_input=invalid?
cmov rcv_input→P
cmov (P*)→B                   /902Y←*rcv_input
```

APPENDIX A-continued

Receiving program:

```
cmov MASK1→A
calu (A&B)→Y
cmov rcv_status→P
cmov (p*)→A
calu (A-Y)→(C,Z)              /903Y&MASK1=*rcv_status?
cmov Y→(*P)                   /904*rcv_status←Y&MASK1
cmov X_00FF→A
calu (B&A)→Y                  /(Remove control bits from Y)
cmov rcv_length→P
cmov (*P)→B
calu (~B)→C                   /905*rcv_length=0?
cmov X_0002→A
calu (Y-A)→Y
cmov X_001F→A
calu (Y&A)→Y
cmov X_0002→A
calu (Y+A)→Y                  /906*rcv_length←(((y−2)
                              &mask)+2)
cmov Y→(*P)
cmov X_0001→B
cmov rcv_count→P
cmov B→(*P)                   /907*rcv_count←1
cmov
FREE POINTER→B
cmov rcv_buffer→P
cmov B→(*P)                   /908*rcv_buffer←free_pointer
calu B→(P,C)                  /909*rcv_buffer= 0?
cmov P→
FREE_POINTER                  /910free_pointer←rcv_buffer[0]
cmov X_0000→B
cmov B→(*P)                   /911*rcv_buffer[0]←0
alu Z→C                       /Rejoin other branches)
cmov rcv_buffer→P
cmov (*P)→B
calu B→C                      /912*rcv_buffer[0]=0?
cmov rcv_count→P
cmov (*P)→A
calu (B+A)→P
cmov Y→(*P)                   /913*rcv_buffer[*rcv_count]←Y
alu Z→C                       /(rejoin other branches)
cmov X_0001→B
calu (B+Z)→Y
cmov rcv_count→P
cmov Y→(*P)                   /914*rcv_count ←*rcv_count+1
cmov rcv_length→P
cmov (*P)→A
calu (Y-A)→(Y,C)              /915*rcv_count=*rcv_length?
cmov Y→(*P)                   /916*rcv_length←0
cmov X_0002→A
cmov rcv_buffer→P
cmov (*P)→B
calu B→Y
calu (B+A)→P
cmov (*P)→A                   /917A←*rcv_buffer[2]
cmov rcv_port→B
cmov B→(*P)                   /918*rcv_buffer[2]←rcv_port
cmov X_000F→B
calu (B&A)→Z                  /919Z←A & MASK
cmov QUEND→A
calu (Z+A)→P
cmov (*P)→B
cmov Y→(*P)                   /920(qend[z])[0]←*rcv_buffer
calu B→P
cmov Y→(*P)                   /921qend[z]←*rcv_buffer
```

APPENDIX B

Transmit program:

```
mov xmit_quead→B
alu B→(P,C)                   /1002xmit_qhead=0?
cmov (*P)→B
calu B→C                      /1003*xmit_qhead=0?
cmov xmit_count→P
cmov (*P)→A
calu (B+A)→P
cmov (*P)→B
cmov DVALID→A
calu (B+A)→Y
cmov xmit_output→P
```

APPENDIX B-continued

Transmit program:

```
cmov Y→(*P)              /1004
                         /*xmit_output←*xmit_qhead[*xmit_count]
cmov xmit_count→P
cmov (*P)→A
cmov X_0001→B
calu (B+A)→Y
cmov Y→(*P)              /1005*xmit_count←*xmit_count+1
cmov xmit_quead→P
cmov (*P)→A
calu (B+A)→P
cmov (*P)→A
calu (18(Y−A))→C         /1006*xmit_count=*xmit_qhead[9]?
cmov xmit_count→P
cmov B→(*P)              /1007*xmit_count←1
cmov xmit_quead→P
cmov (*P)→B
calu B→(Y,P)
cmov (*P)→B
calu B→Z                 /1008Y←*xmit_qhead
cmov xmit_quead→P
cmov B→(*P)              /1009*xmit_quead←Y[0]
cmov FREE_POINTER→B
calu Y→P
cmov B→(*P)              /1010Y[0]←free_pointer
cmov Y→FREE_POINTER      /1011free_pointer←Y
calu (~Z)→C              /1012*xmit_qhead=0?
cmov xmit_quead→B
cmov xmit_qend→P
cmov B→(*P)              /1013*xmit_qend←xmit_qhead
mov X_0000→B
mov clear_pointer→P
mov B→(*P)               /1014*xmit_clear←0
```

What is claimed is:

1. A telecommunication switching system for interconnecting digitally encoded voice signals between a set of randomly selectable input ports and a set of randomly selectable output ports and for assembling digital data signals from another set of said randomly selectable input ports into packets and transmitting said packets to another set of said randomly selectable output ports, said system comprising:

a first storage means for storing said digitally encoded voice signals and said digital data signals from said input ports into predetermined storage locations;

switching processor means responsive to a receipt of a first set of program instruction routines for processing said stored digitally encoded voice signals;

a second storage means connectable to said output ports for storing said processed voice signals in predetermined storage locations thereof;

said switching processor means being responsive to a receipt of a second set of program instruction routines for processing said stored digital data signals to assemble and store said packets in said switching processor means; and said switching processor means being responsive to a receipt of a third set of program instruction routines for processing each of said packets for transmission of each of said processed packets to said second storage means; whereby said stored packets are transmitted to said other set of said output ports.

2. The invention of claim 1 wherein said switching processor means comprises a first processor means, a first memory means, and a second memory means having a first memory buffer containing a plurality of memory locations and a second memory buffer containing a plurality of memory locations;

said first memory means having a plurality of word locations for storing instruction signals representing said second set of program instruction routines and said first memory means repetitively accessed to transmit said instruction signals to said first processor means;

said first processor means responsive to said instruction signals for reading a first digital word of digital data signals from a storage location in said first storage means associated with a designated one of said other set of said input ports and for storing the read first digital word in one of said memory locations of said first memory buffer reserved for the assembly of a packet of said digital data words for said designated one of said other set of said input ports.

3. The invention of claim 2 wherein said first processor means is responsive to said instruction signals and a second digital word stored in a second memory location of said second memory means to affect said reading of said first digital word from said first storage means.

4. The invention of claim 3 wherein said switching processor means further comprises a second processor means, a third memory means, and a fourth memory means;

said third memory means comprises a first memory segment associated with said second digital word of said second memory means, and said first memory segment of said third memory comprises a plurality of memory locations;

said fourth memory means having a plurality of memory locations for storing instruction signals, and said fourth memory means repetitively accessed to transmit all of said fourth memory means instruction signals to said second processor means within a fixed time period; and said second processor means responsive to said instruction signals to said fourth memory means for reading one digital word from said first memory segment of said third memory means and for storing said read digital word from said first memory segment in said second memory location of said second memory means.

5. The invention of claim 3 wherein said first processor means is responsive to said instruction signals and a third digital word stored in a third memory location of said second memory means for said storing of the read first digital word in said one of said memory locations of said first memory buffer associated with said designated one of said other set of said input ports.

6. The invention of claim 5 wherein said switching processor means further comprises a second processor means, a third memory means, and a fourth memory means;

said third memory means comprises a second memory segment associated with said third digital word of said second memory means, and said second memory segment of said third memory having a plurality of memory word locations;

said fourth memory means having a plurality of memory locations for storing instruction signals, and said fourth memory means repetitively accessed to transmit all of said fourth memory means instruction signals to said second processor means within a fixed time period; and said second processor means is responsive to said instruction signals of said fourth memory means for reading one digital word from said second memory segment of said third memory means and for storing said read digital word from said second memory segment in said third memory location of said second memory means.

7. The invention of claim 2 wherein said first memory means further stores other instruction signals representing said third set of program instruction routines and said first memory means repetitively accessed to transmit said other instruction signals to said first processor means;

said first processor means is responsive to said other instruction signals for reading a second digital word stored in a second memory location of said second memory buffer in said second memory means which is reserved for a completed packet of digital words awaiting transmission to a designated one of said other set of said output ports and for storing said read second digital word in a memory location of said second storage means associated with said designated one of said other set of said output ports.

8. The invention of claim 7 wherein said first processor means is responsive to said other instruction signals and a third digital word stored in a third memory location of said second memory means for said reading of the second digital word from said second memory location.

9. The invention of claim 8 wherein said switching processor means further comprises a second processor means, a third memory means, and a fourth memory means;

said third memory means comprises a first memory segment associated with said third digital word of said second memory means, and said first memory segment of said third memory comprises a plurality of memory word locations;

said fourth memory means having a plurality of memory locations for storing instruction signals, and said fourth memory means repetitively accessed to transmit all of said fourth memory means instruction signals to said second processor means within a fixed time period; and said second processor means responsive to said instruction signals of said fourth memory means for reading one digital word from said first memory segment of said third memory means and for storing said read digital word for said first memory segment in said third memory location of said second memory means.

10. The invention of claim 8 wherein said first processor means is responsive to said other instruction signals and a fourth word stored in a fourth memory location of said second memory means for said storing of the read second digital word in said storage location of said second storage means associated with said designated one of said other set of said output ports.

11. The invention of claim 10 wherein said switching processor means further comprises a second processor means, a third memory means, and a fourth memory means;

said third memory means comprises a first memory segment associated with said fourth digital word of said second memory means, and said first memory segment of said third memory comprises a plurality of memory word locations;

said fourth memory means having a plurality of memory locations for storing instruction signals, and said fourth memory means repetitively accessed to transmit all of said fourth memory means instruction signals to said second processor means within a fixed time period; and said second processor means is responsive to said instruction signals of said fourth memory means for reading one digital word from said first memory segment of said third memory means and for storing said read digital word from said first memory segment in said fourth memory location of said second memory means.

12. A telecommunication switching system for the integrated switching of voice telephone calls and the assembly and switching of data packets, said system comprising:

a plurality of telephone stations and data terminals;

a first storage means for storing digital encoded voice signals from said telephone stations and digital data signals from said data terminals into predetermined storage locations;

a second storage means for storing said digitally encoded voice and digital data signals into predetermined storage locations for transmission to said telephone stations and said data terminals;

apparatus for switching said encoded voice signals and digital data signals from said telephone stations and data terminals, respectively, and storing said encoded voice and digital data signals in said memory locations of said first storage means, and to transfer said encoded voice and digital data signals from said second storage means to said telephone stations and data terminals, respectively;

a switching processor responsive to a receipt of program instructions for controlling the switching of said voice and digital data signals from said first storage means to said second storage means and communication therefrom to said stations and said terminals;

said switching processor having a first processor and a first program memory for supplying said program instructions to said first processor, a first data memory, a second processor responsive to a receipt of instructions from a second program memory, and a second data memory for supplying data to said second processor;

said first memory cooperative with said second processor for controlling operation of said first processor;

said second data memory having a plurality of memory locations cooperative with said first and second processors for assembling packets of data read from said first storage means in said first data memory via said first processor, and for transferring assembled data packets from said first data memory to said second storage means for transmission to a destination in one of said terminals via said apparatus.

13. The invention of claim 11, wherein said second processor is responsive to said receipt of said instructions from said second program memory for reading the contents of a second memory location of said data memory and for storing said read contents of said second memory location in a third memory location of said first data memory;

said first processor is responsive to said receipt of said instructions from said first program memory and said contents of said third memory location to read a first word of digital data from said first storage means.

14. The invention of claim 13, wherein said second processor responsive to said instructions from said second program memory to read contents of a fourth memory location in said second data memory and for storing said contents of said fourth memory location in a fifth memory location of said first data memory;

said first processor is responsive to said instructions from said first program memory and said contents of said fifth memory location for storing said first word in said first data memory as part of a packet associated with said destination one of said output terminals.

15. The invention of claim 12, wherein said second processor is responsive to a receipt of one of said instructions from said second program memory for reading the contents of a sixth memory location in said second data memory for storing the read contents of said sixth memory location in a seventh memory location in said first data memory;

said first processor is responsive to said receipt of said instructions from said first program memory and said contents of said seventh memory location for reading word from said packet associated with said destination one of said data terminals stored in said first data memory.

16. The invention of claim 15, wherein said second processor is responsive to a receipt of another one of said instruction from said second program memory to read contents of an eight memory location stored in said second data memory and for storing said contents of said eighth memory location in a ninth memory location of said first data memory;

said first processor is responsive to said receipt of said instructions from said first program memory and said contents of said ninth memory memory location for storing said word from said packet in the word of said output memory associated with said destination one of said data terminals.

17. For use in a communication switching system for integrated voice and data services and comprises:

a plurality of telephone stations and data terminals;

a first storage means for storing digitally encoded voice signals from said telephone stations and digital signals from said data terminals into predetermined storage locations;

a second storage means for storing processed digitally encoded voice and digital data signals into predetermined storage locations for transmission to said telephone station and said data terminals;

apparatus for switching said encoded voice signals and digital data signals from said telephone stations and data terminals, respectively, and storing said encoded voice and digital data signals in said memory locations of said first storage means and to transfer said encoded voice and digital data signals from said second storage means to said telephone stations and data terminals;

a switching processor responsive to receipt of stored program instructions to communicate encoded voice signals from calling ones of said stations stored in said first storage means to said second storage means for subsequent communication through said apparatus to called ones of said telephone stations;

said switching processor having a first processor and a first program memory for supplying said first processor with said program instructions, a first data memory, a second processor responsive to instructions from a second program memory, and a second data memory for supplying data to said second processor;

the invention comprises means in said first processor responsive to instructions from said first program memory and data transmitted from said second processor via said first data memory for assembling packets of data read from said first storage means in said first data memory and for transferring assembled data packets from said first data memory to said second storage means for transmission to a destination one of said terminals via said apparatus;

said second processor responsive to said instructions from said second program memory to read data from said second data memory and store said data in said first data memory.

18. A method for communicating voice signals between telephone stations and for assembling data signals from data terminals into data packets and for transmission of assembled data packets to destination data terminals;

communicating said voice and data signals from one of said telephone stations and one of data terminals, respectively, for storage in an input memory;

sending the voice signals from said input memory for storage in an output memory;

communicating the voice signals from said output memory to one of said telephone stations;

transferring the data signals from said input memory for storage in a buffer in a data memory associated with a destination one of said data terminals until said buffer contains a completed packet;

communicating the data signals from said buffer containing said completed packet for storage in said output memory;

sending the data signals from said output memory to said destination one of said data terminals.

19. The invention of claim 18 wherein said transferring step is characterized by assigning said buffer from a group of unassigned buffers upon receiving the first digital word of said packet from said input memory at the start of transmission of said packet.

20. The invention of claim 19 wherein said buffer of said group of unassigned buffers is identified by contents of a first memory location in said data memory and contents of the first memory location of said buffer identifying another one of said unassigned buffers and characterized by transferring said contents of said first memory location in said data memory to a second memory location in said data memory associated with said one of data terminals for assigning said buffer to said destination one of said data terminals;

transferring said contents of said first memory location of said buffer to said first memory location in said data memory for identifying said other one of said unassigned buffers by said contents of said first memory location in said data memory.

21. The invention of claim 18 wherein the digital word of said packet of said data signals designating a number of words in said packet and being stored in a first memory location of said data memory.

22. The invention of claim 21 further comprising the step of identifying said first memory location by accessing the contents of a second memory location of said data memory for obtaining the address of said first memory location, and storing the first word of said packet in said first memory location under address control of said contents of said second memory location.

23. The invention of claim 22 comprising the step of storing the contents of a third memory location in a parameter memory into said second memory location by reading said contents of said third memory location from said parameter memory, and storing said read contents of said third memory location in said second memory location of said data memory.

24. The invention of claim 18 wherein said step of transferring said data signals from said input memory to said buffer in said data memory is characterized by identifying the memory location of a digital word containing said data signals and associated with said one of said data terminals in said input memory by accessing contents of a first memory location in said data memory to obtain the address identifying said memory location of said digital word associated with said one of said data terminals, and addressing said memory location in said input memory with said contents of said first memory location, and reading said associated digital word from said input memory for transferring said associated digital word to said buffer in said data memory.

25. The invention of claim 24 further comprising the step of transferring the contents of a second memory location in a parameter memory into said first memory location by reading said contents of said second memory location from said parameter memory, and storing said contents of said second memory location in said first memory location of said data memory whereby said contents of said second memory location controls the identification of said associated digital word in said input memory.

26. The invention of claim 21 further comprising the step of detecting the completed assembly of said data packet by initializing a second digital word stored in a second memory location of said data memory to a preset value, incrementing said contents of said second memory location upon receipt of each data word from said one of said data terminals for accumulating in said second memory location the number of received data packet words, comparing the contents of said second memory location with the contents of said first memory location for checking whether said number of received packet words equals the expected number of packet words with a match indicating completion of said packet.

27. The invention of claim 26 further comprising the step of identifying said second memory location in said data memory by accessing the contents of a third memory location of said data memory for obtaining the address of said second memory location, and reading said contents of said second memory location under address control of said read contents of said third memory location.

28. The invention of claim 27 further comprising the step of transferring the contents of a fourth memory location of a parameter memory into said third memory location for controlling the addressing of said second memory location by reading said contents of said fourth memory location from said parameter memory, and storing said read contents of said fourth memory location in said third memory location of said data memory.

29. The invention of claim 20 further comprising the step of identifying the memory location in said buffer for storing a data word of said data signals from said one of said data terminal by identifying the first word of said buffer by storing the address of said first word of said buffer in said second memory location;

initializing the contents of a third memory location of said data memory to a preset value;

incrementing said contents of said third memory location upon receipt of each digital word of data signals from said one of said data terminals for accumulating in said third memory location the number of received data packet words;

adding said contents of said second memory location to contents of said third memory location for identifying said memory location in said buffer;

storing said digital word in said memory location in said buffer identified by results of said addition.

30. The invention of claim 29 further comprising the step of identifying said second memory location in said data memory by reading the contents of a fourth memory location of said data memory; and reading said contents of said second memory location under address control of said read contents of said fourth memory location.

31. The invention of claim 30 further comprises the step of transferring the contents of a fifth memory location in a parameter memory into said fourth memory location for controlling the identification of said second memory location by said contents of said fifth memory location;

reading said contents of said fifth memory location from said parameter memory; and storing said read contents of said fifth memory location in said fourth memory location of said data memory.

32. The invention of claim 18 wherein said step of communicating said data signals from said buffer containing completed packet to said output memory characterized by storing said data signals in a first memory location in said output memory associated with said one of said destination data terminals and identifying said first memory location by
- accessing contents of a second memory location in said data memory for obtaining the address of said first memory location; and
- storing a digital word of said data signals from said completed packet in said first memory location of said output memory under address control of said read contents of said second memory location for transferring said data signals to said destination one of said data terminals.

33. The invention of claim 32 further comprising the step of transferring the contents of a third memory location in a parameter memory into said second memory location by
- reading said contents of said third memory location from said parameter memory; and
- storing said read contents of said third memory location in said second memory location of said data memory whereby said contents of said third memory location control the identification of said first memory location.

34. The invention of claim 20 wherein said buffer holding the assembled completed packet is identified with another one of buffers containing packets awaiting transmission to said one of said destination data terminals and identifying said other one of said buffers with contents of a third memory location and a fourth memory location in said data memory by
- storing said contents of said first memory location in said data memory in the first memory location of said other one of buffers awaiting transmission for identifying said buffer holding the assembled completed packet with said other one of said buffers; and
- transferring contents of said first memory location of said data memory to said fourth memory location of said data memory for identifying said buffer holding the assembled completed packet as the last buffer awaiting transmission to said destination one of said data terminals.

35. The invention of claim 34 further comprising the step of first transmitting said packet stored in said other buffer and then transmitting said packet stored in said buffer by
- identifying the first memory location of said other buffer with said contents of said third memory location;
- identifying the first memory location of said buffer with said contents of said fourth memory location;
- counting the number of words transmitted from the buffer identified by said contents of said third memory location by storing the number of words transmitted in a fifth memory location of said data memory;
- adding said contents of said third memory location and said contents of said fifth memory location together, reading the next word to be transmitted from said other buffer under address control of the result of said addition and incrementing said contents of said fifth memory location, storing the read next word in said output memory and continuing until all words of said other buffer have been transmitted,
- storing said contents of said first memory location of said other buffer in said third memory location for identifying said buffer as buffer to be transmitted to said destination one of said data terminals;
- transferring contents of the first memory location of said buffer to said fourth memory location;
- setting said contents of said fifth memory location to a predetermined value;
- adding said contents of said third memory location and said contents of said fifth memory location together, incrementing said contents of said fifth memory location, reading the next word to be transmitted of said buffer under address control of the result of said second addition, and storing the read next word in said output memory and continuing until all words of said buffer have been transmitted.

36. The invention of claim 35 comprising a further step of identifying said fourth memory location in said data memory using contents of a sixth memory location in said data memory by
- storing contents of a seventh memory location from a parameter memory in said sixth memory location in said data memory whereby said contents of said seventh memory location control the identification of said third memory location;
- reading said contents of said sixth memory location in said data memory; and
- reading said contents of said third memory location under address control of said contents of said sixth memory location.

37. The invention of claim 35 further comprises the step of identifying said fourth memory location in said data memory using the contents of a sixth memory location of said data memory by
- storing contents of a seventh memory location of a parameter memory in said sixth memory location in said data memory for controlling the addressing of said fourth memory location by said contents of said seventh memory location;
- accessing said contents of said sixth memory location of said data memory for obtaining the address of said fourth memory location; and
- reading said contents of said fourth memory location under address control of said contents of said sixth memory location.

38. The invention of claim 35 further comprising a step of identifying said fifth memory location in said data memory using the contents of a sixth memory location of said data memory by
- storing contents of a seventh memory location of a parameter memory in said sixth memory location in said data memory for controlling the addressing of said fifth memory location by said contents of said seventh memory location;
- reading said contents of said seventh memory location of said data memory; and
- reading said contents of said fifth memory location under address control of said read contents of said seventh memory location.

* * * * *